Figure 32:
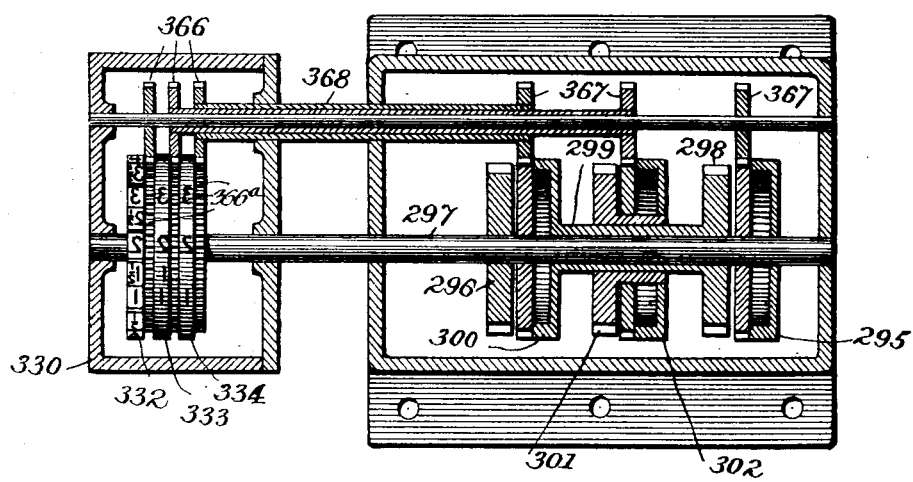

B. M. DES JARDINS.
MACHINE FOR WEIGHING, COMPUTING, INDICATING, AND RECORDING.
APPLICATION FILED NOV. 25, 1901.
1,184,330.
Patented May 23, 1916.
19 SHEETS—SHEET 1.
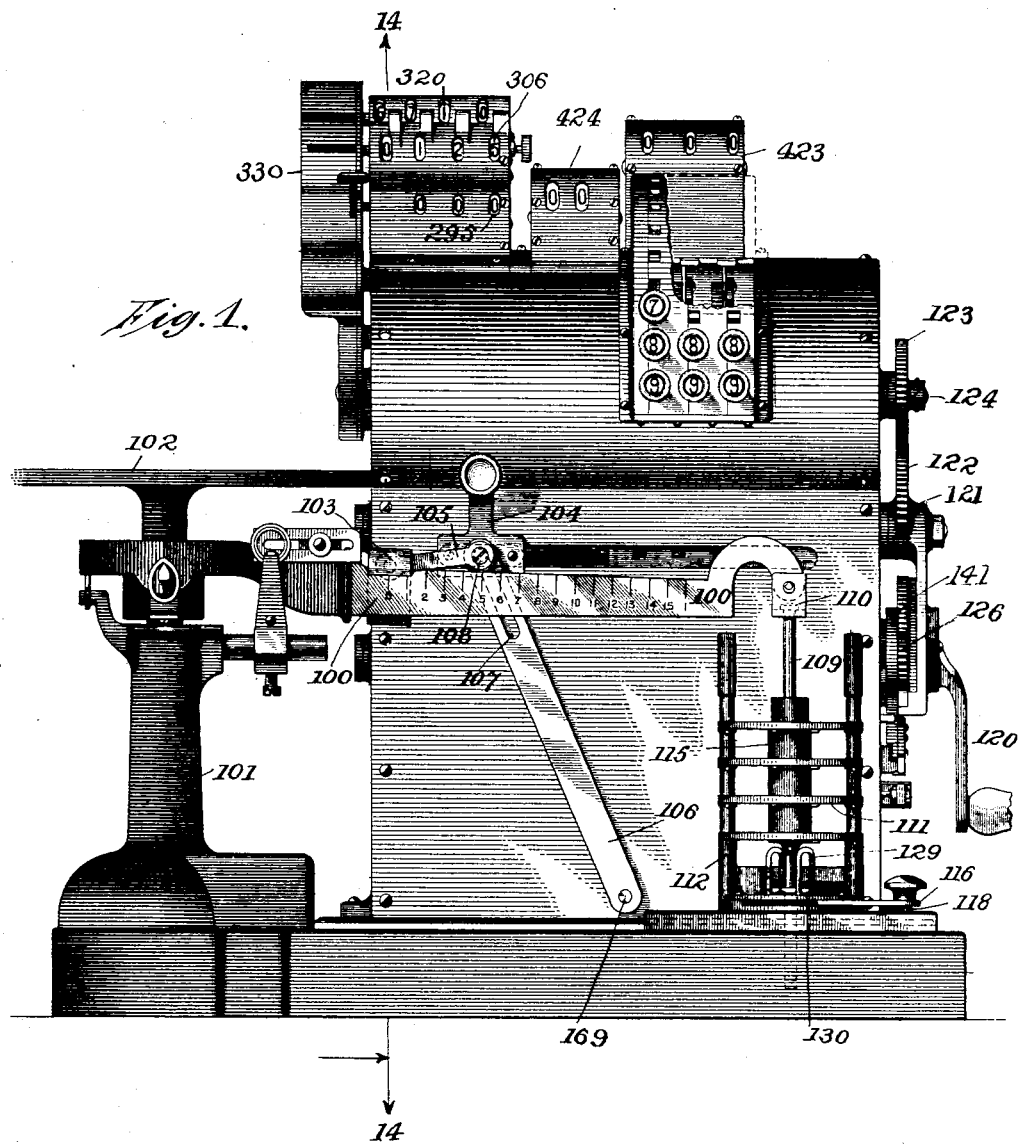

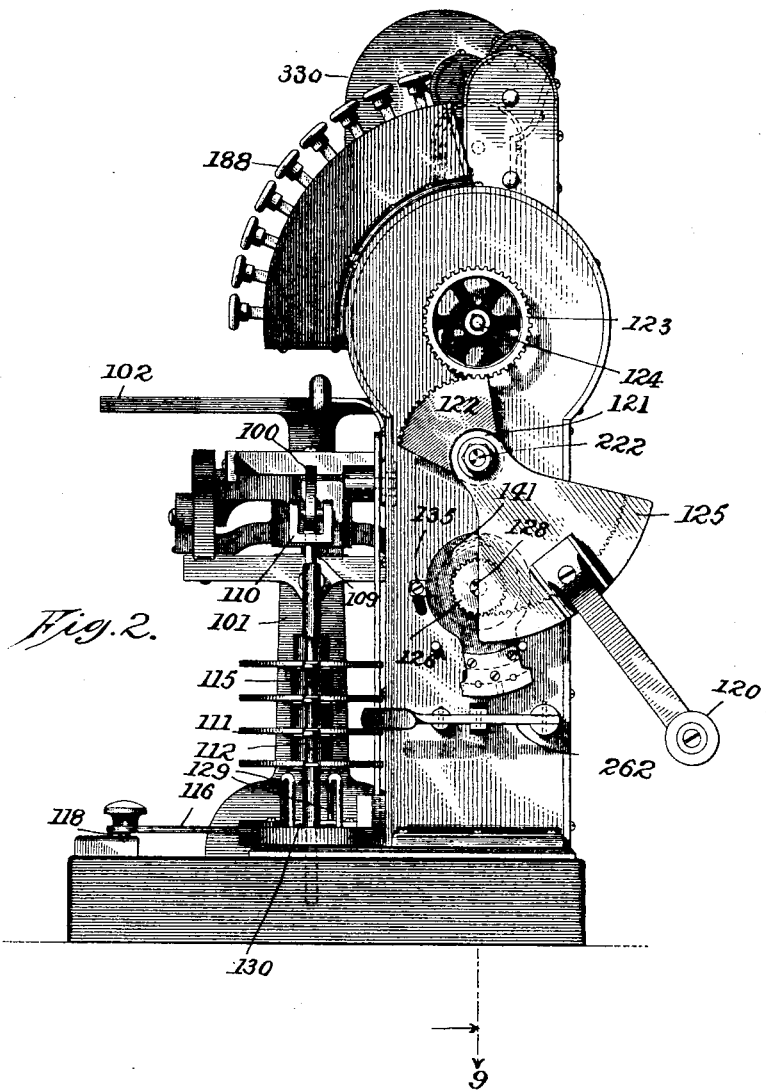

B. M. DES JARDINS.
MACHINE FOR WEIGHING, COMPUTING, INDICATING, AND RECORDING.
APPLICATION FILED NOV. 25, 1901.
1,184,330.
Patented May 23, 1916.
19 SHEETS—SHEET 3.
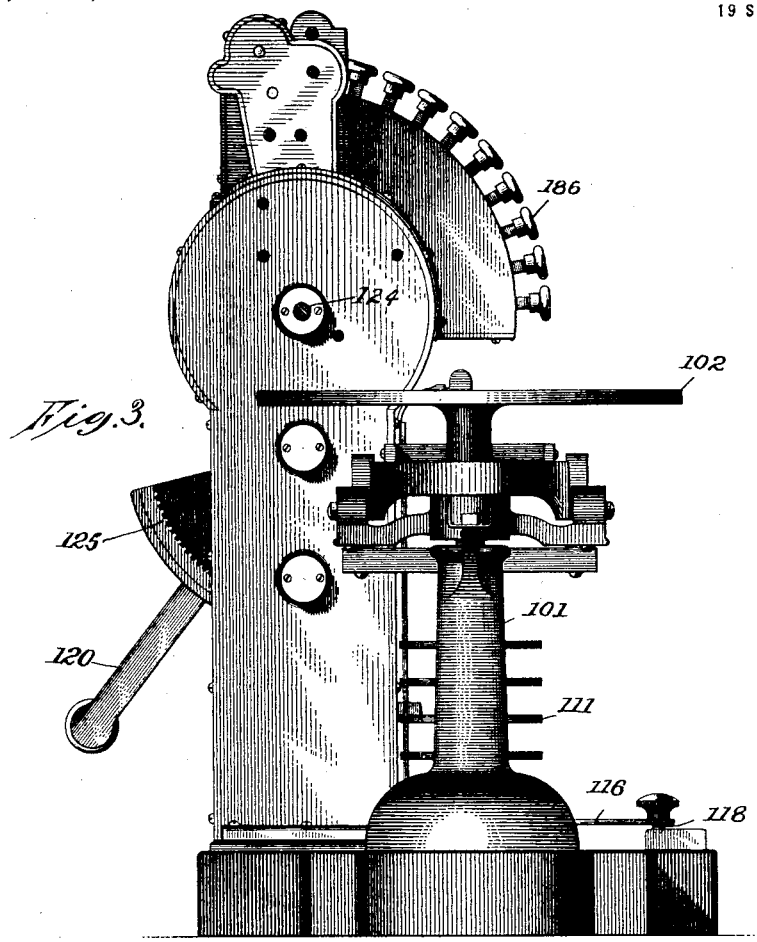
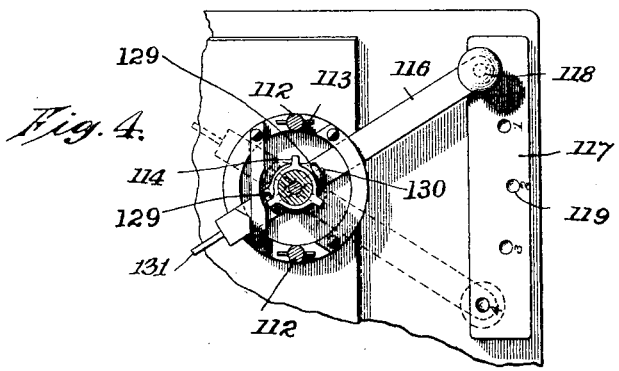

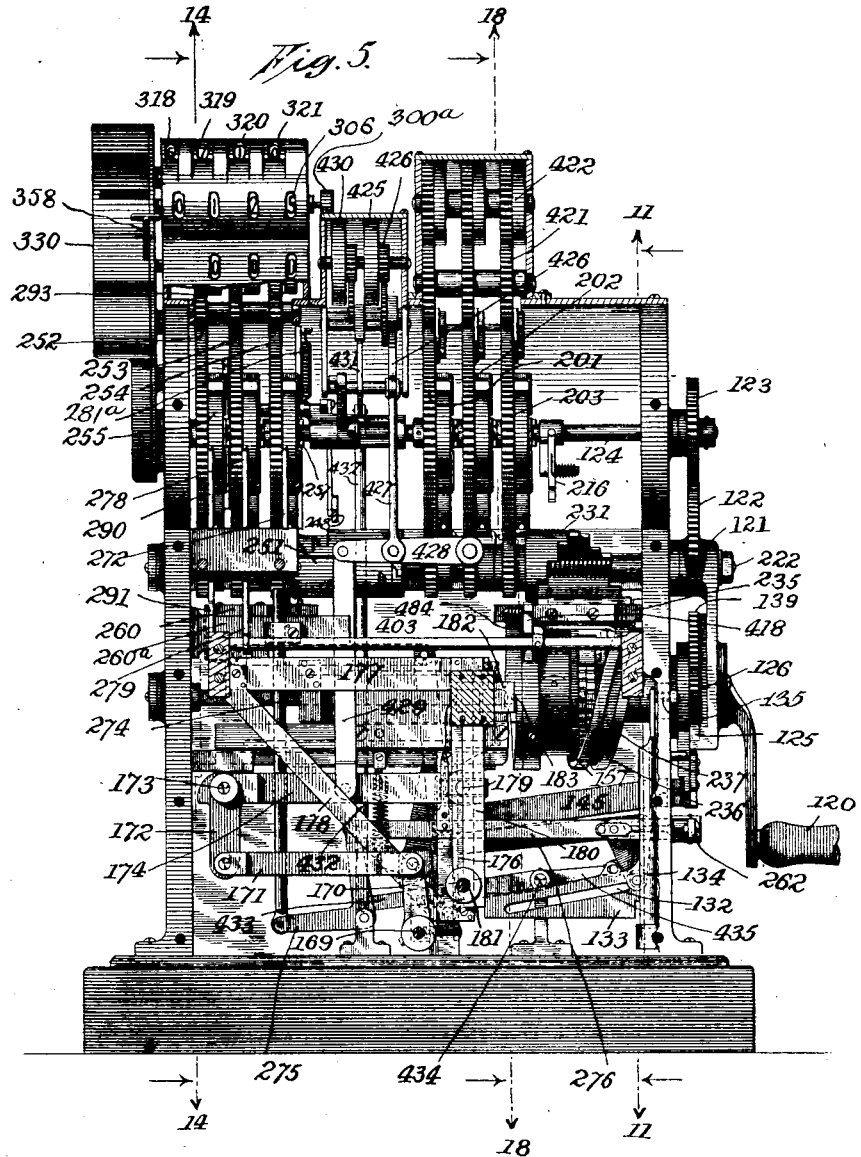

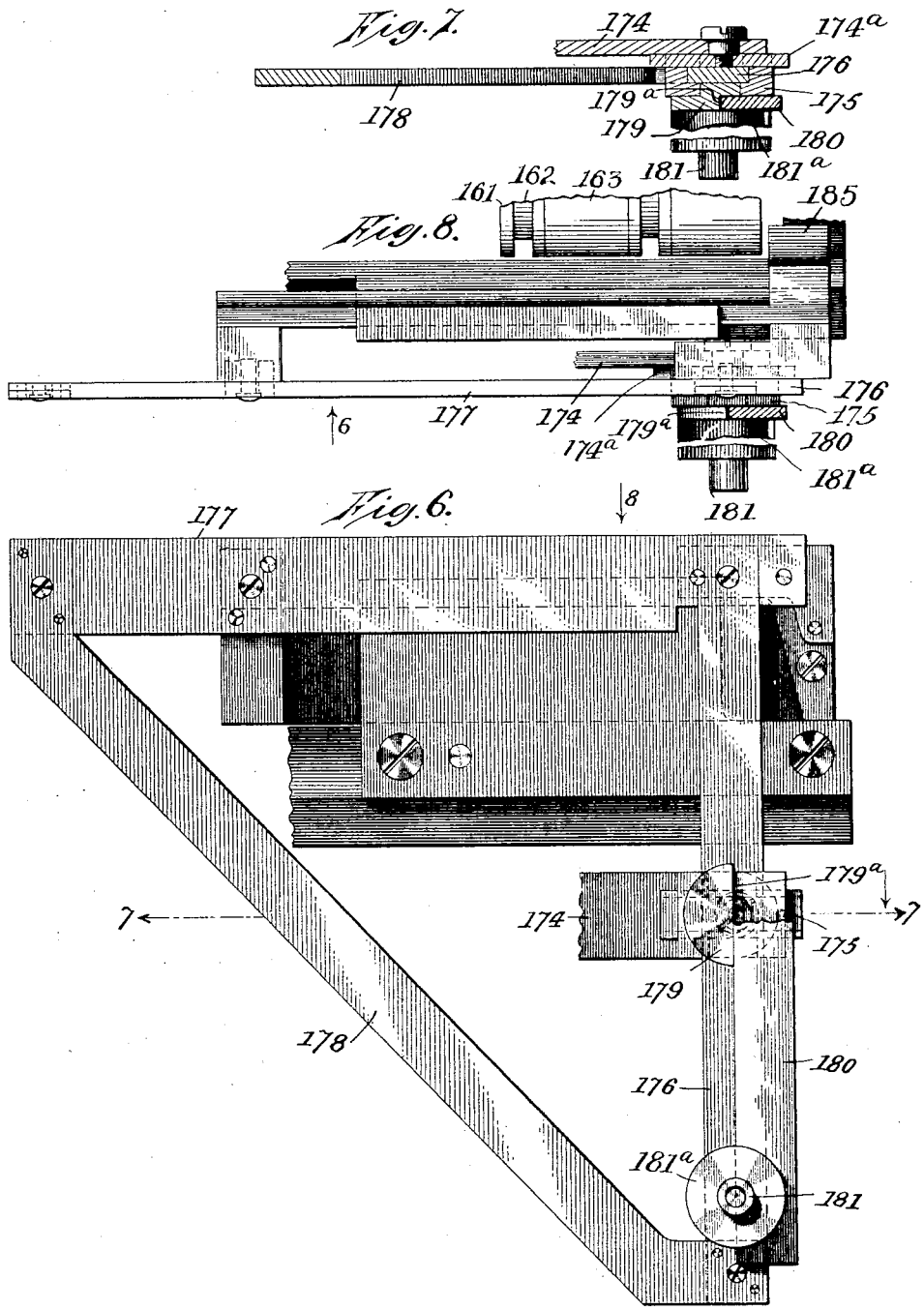

B. M. DES JARDINS.
MACHINE FOR WEIGHING, COMPUTING, INDICATING, AND RECORDING.
APPLICATION FILED NOV. 25, 1901.
1,184,330.
Patented May 23, 1916.
19 SHEETS—SHEET 6.
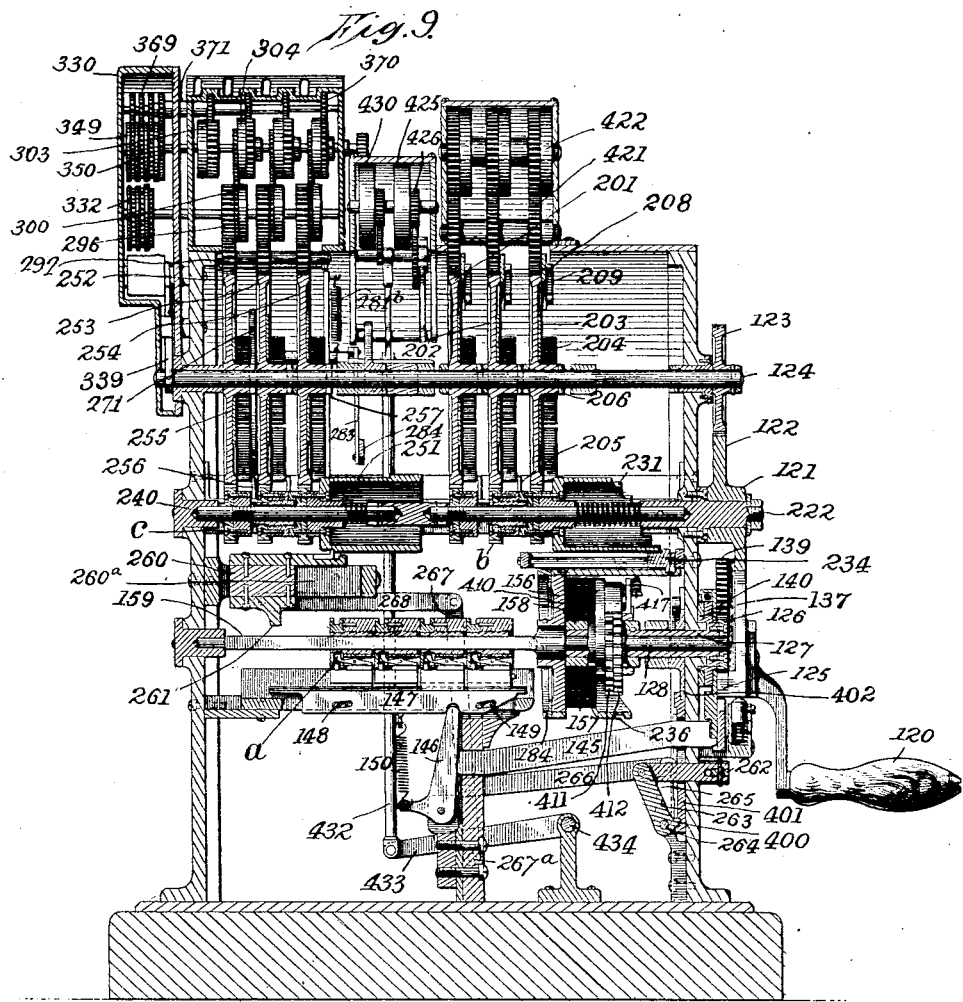

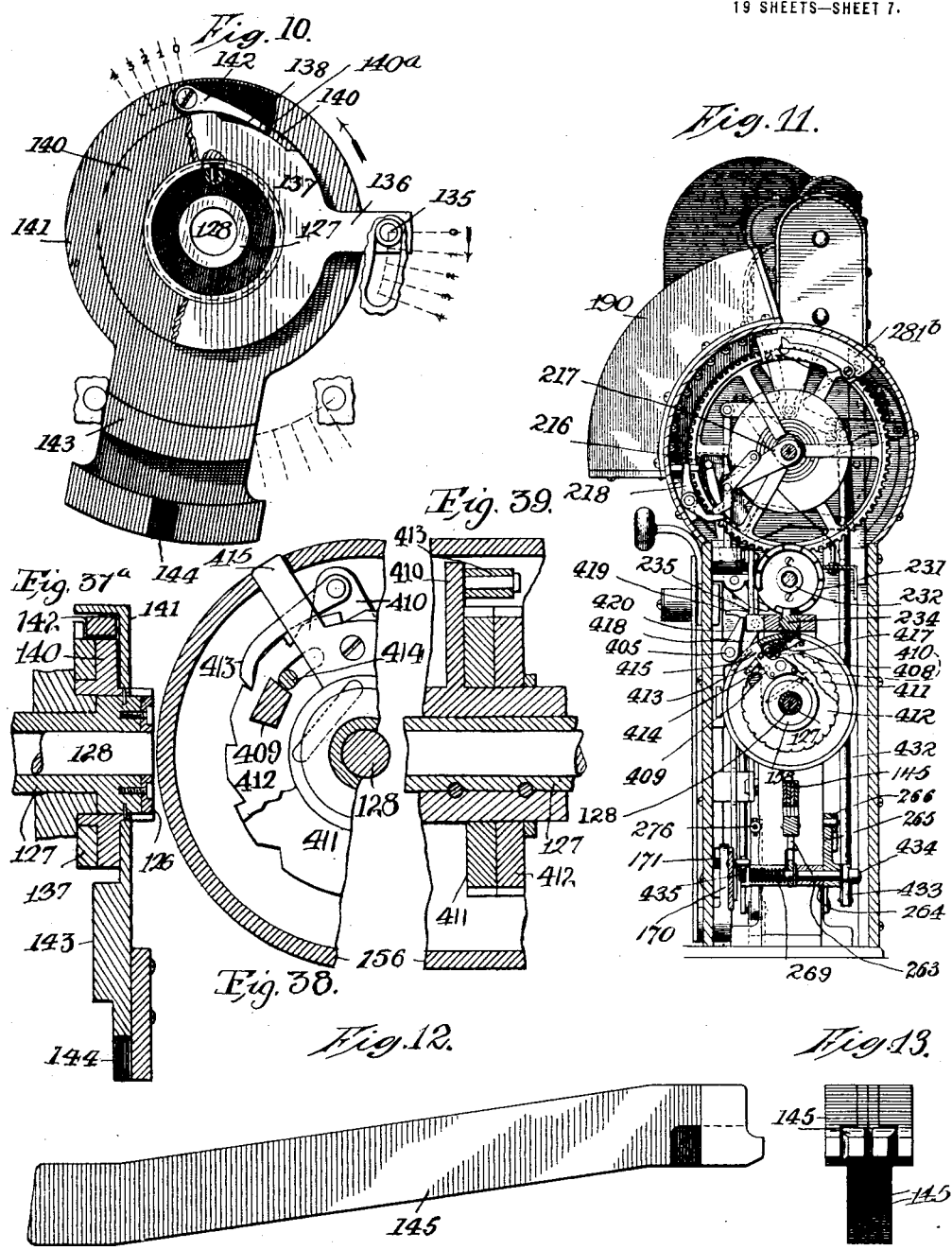

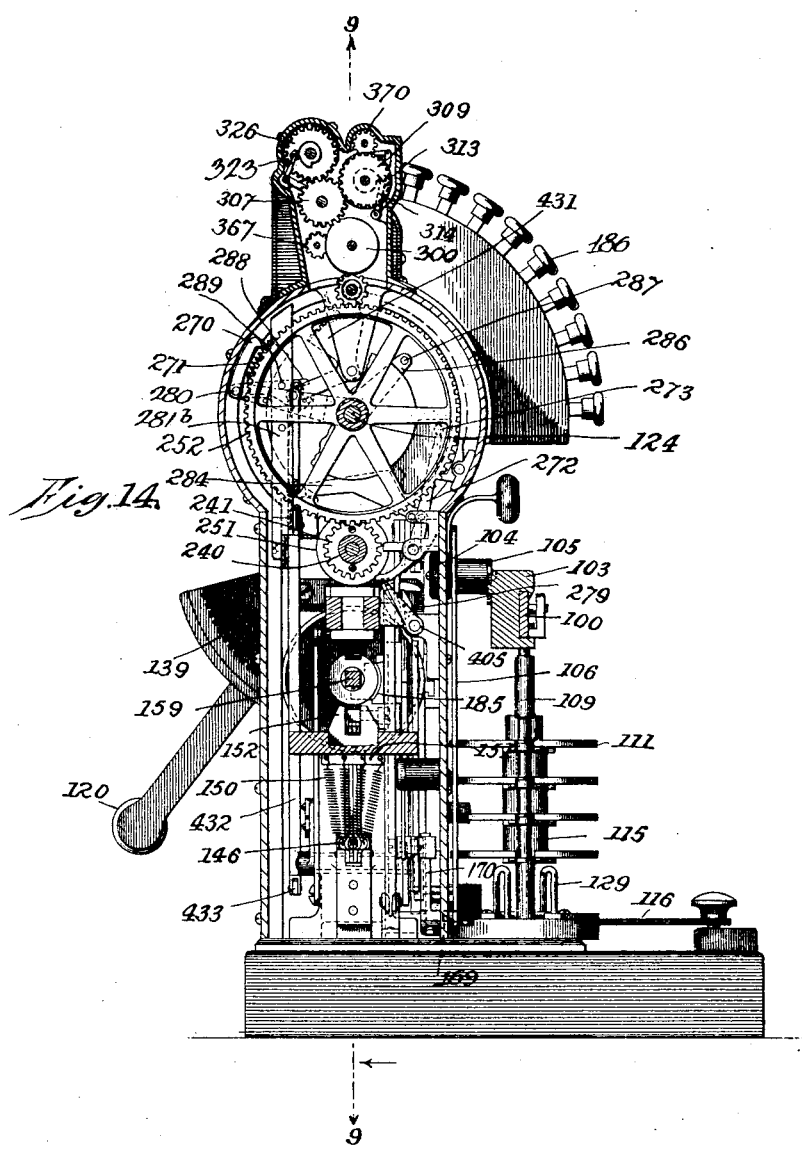

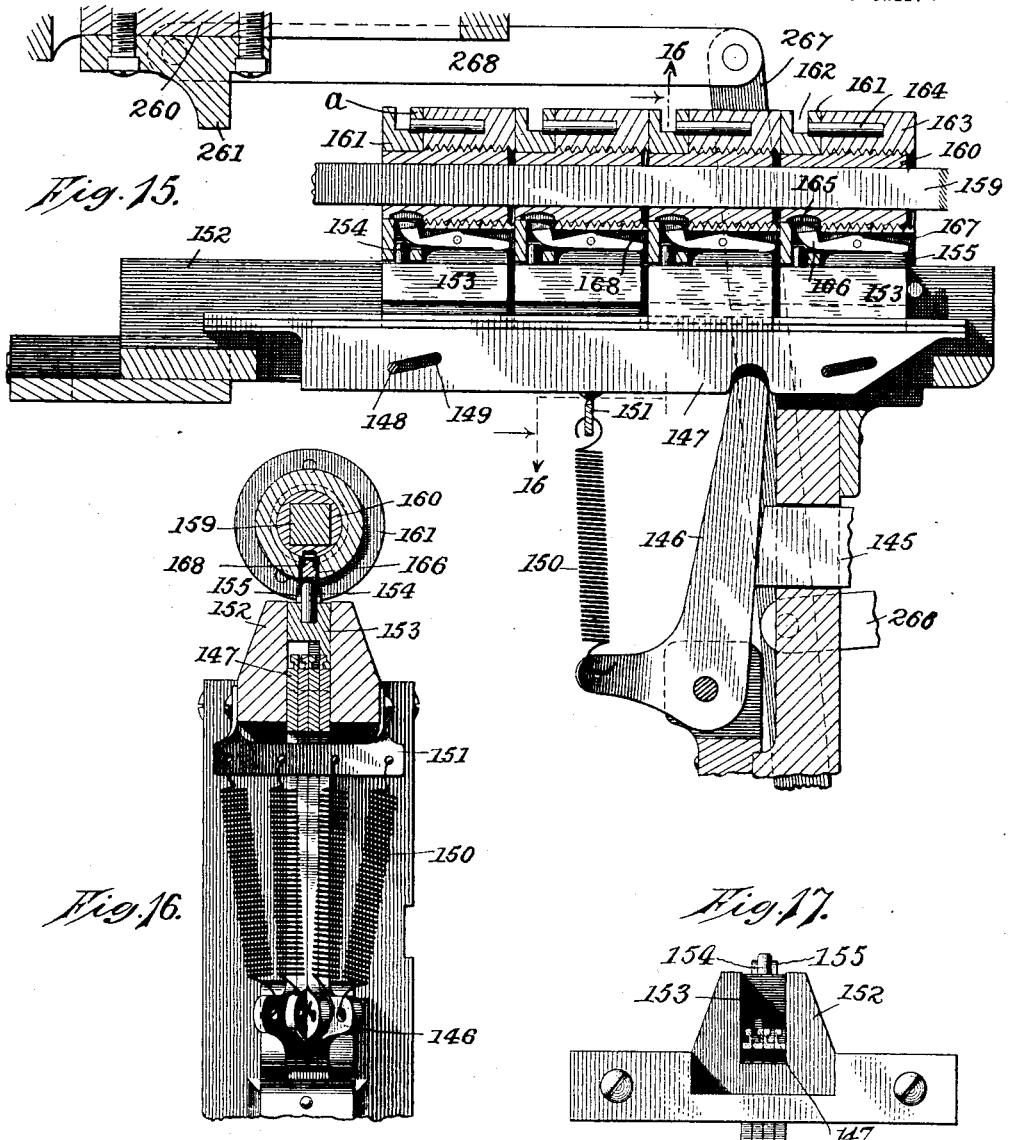

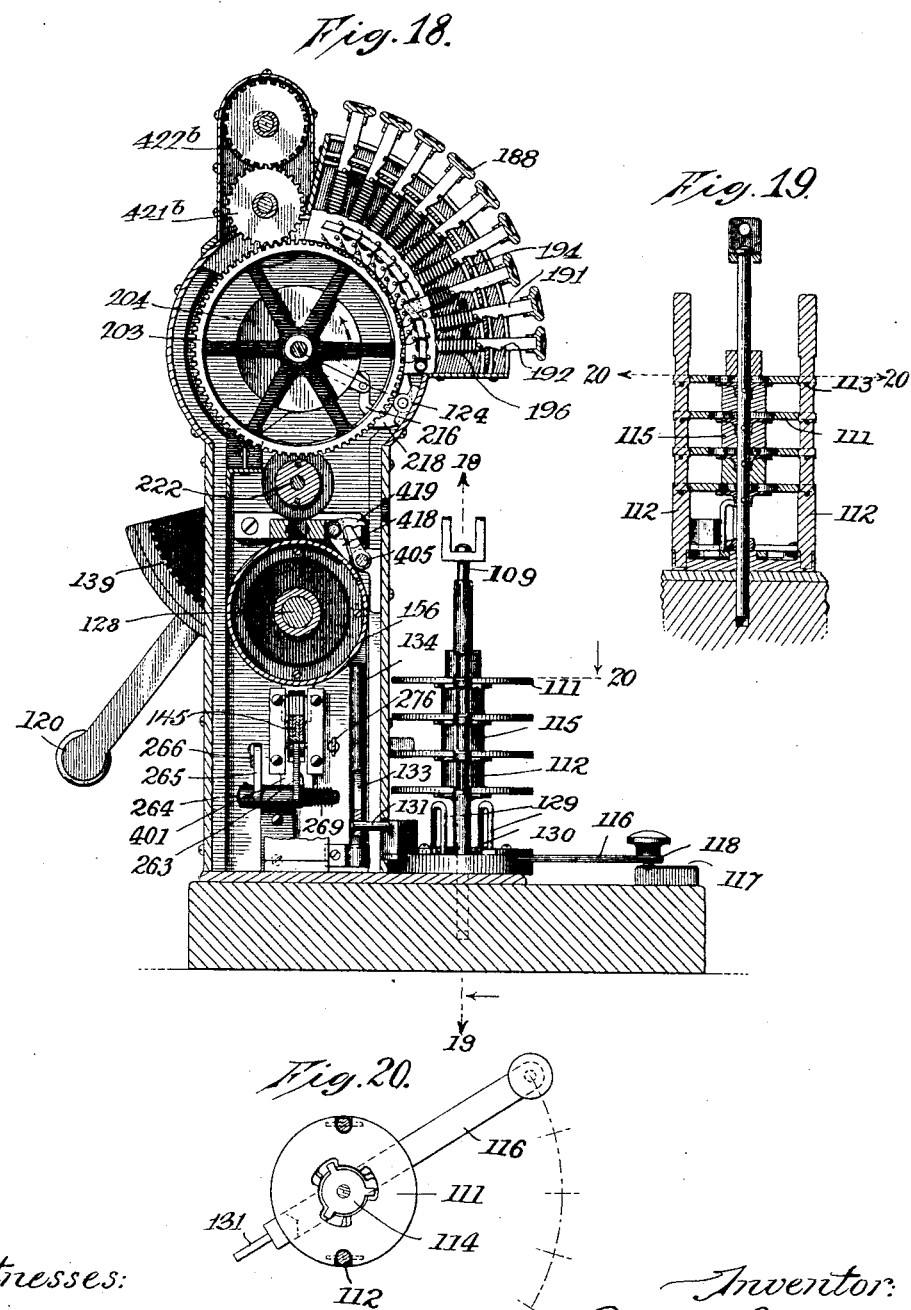

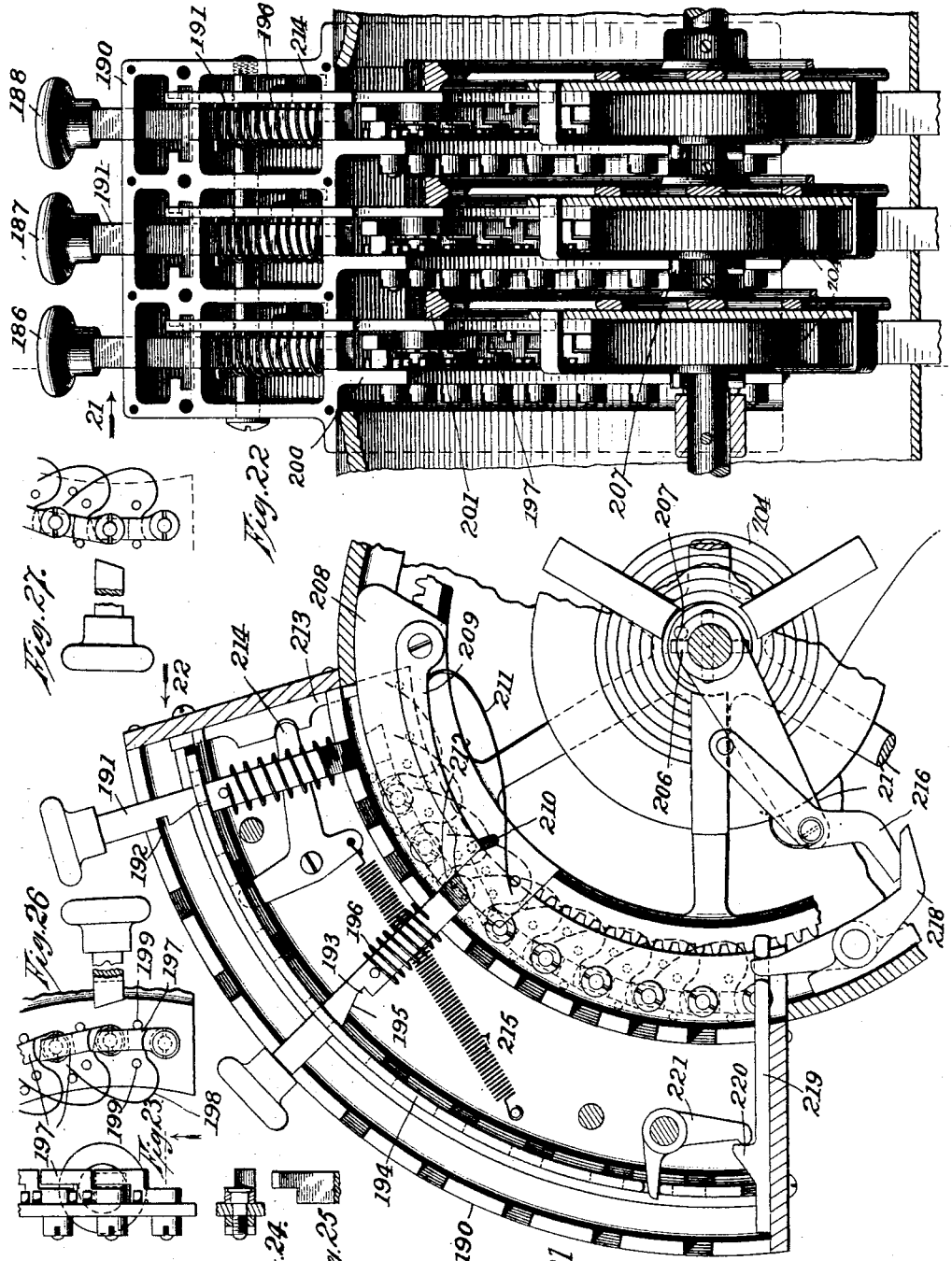

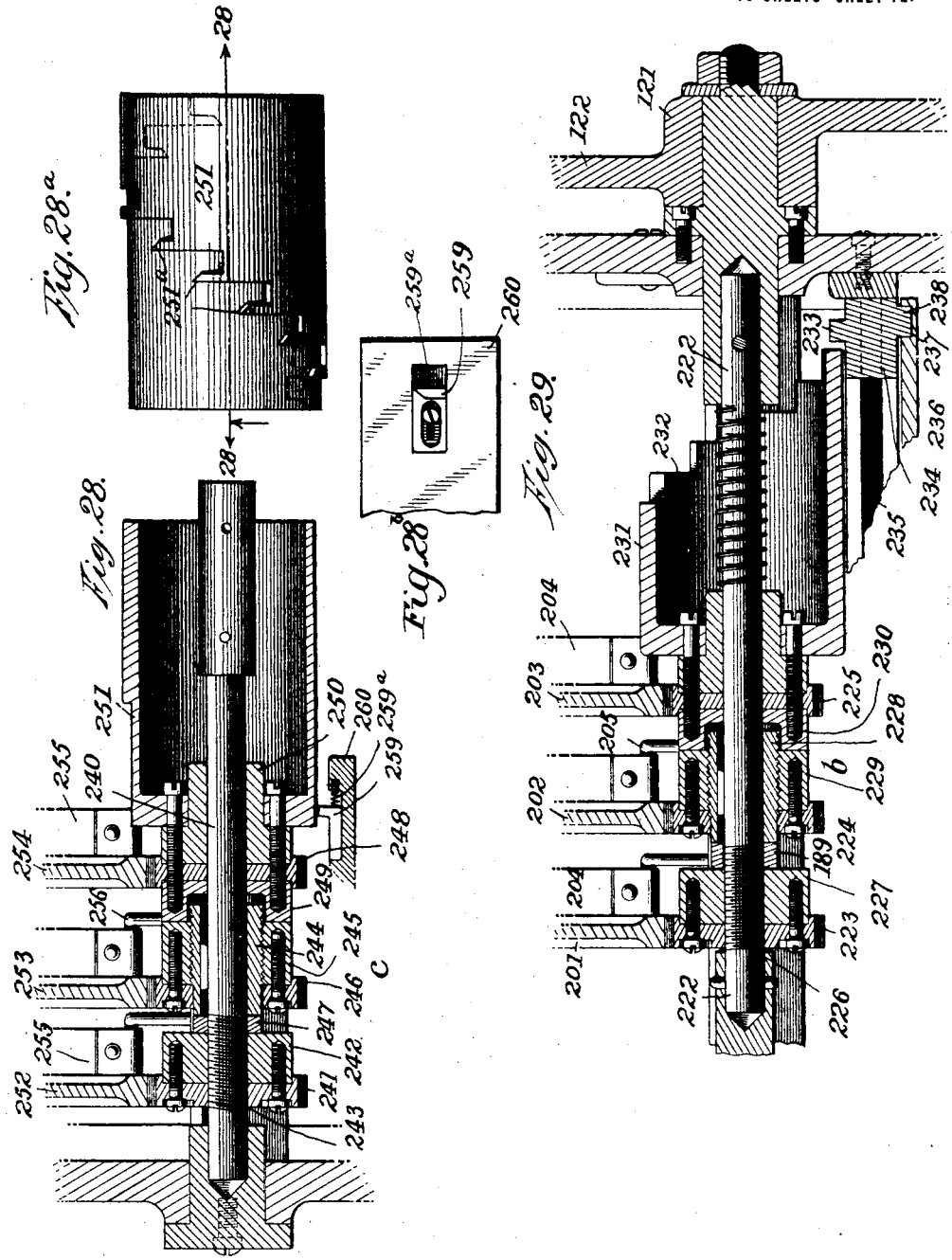

B. M. DES JARDINS.
MACHINE FOR WEIGHING, COMPUTING, INDICATING, AND RECORDING.
APPLICATION FILED NOV. 25, 1901.
1,184,330.
Patented May 23, 1916.
19 SHEETS—SHEET 13.
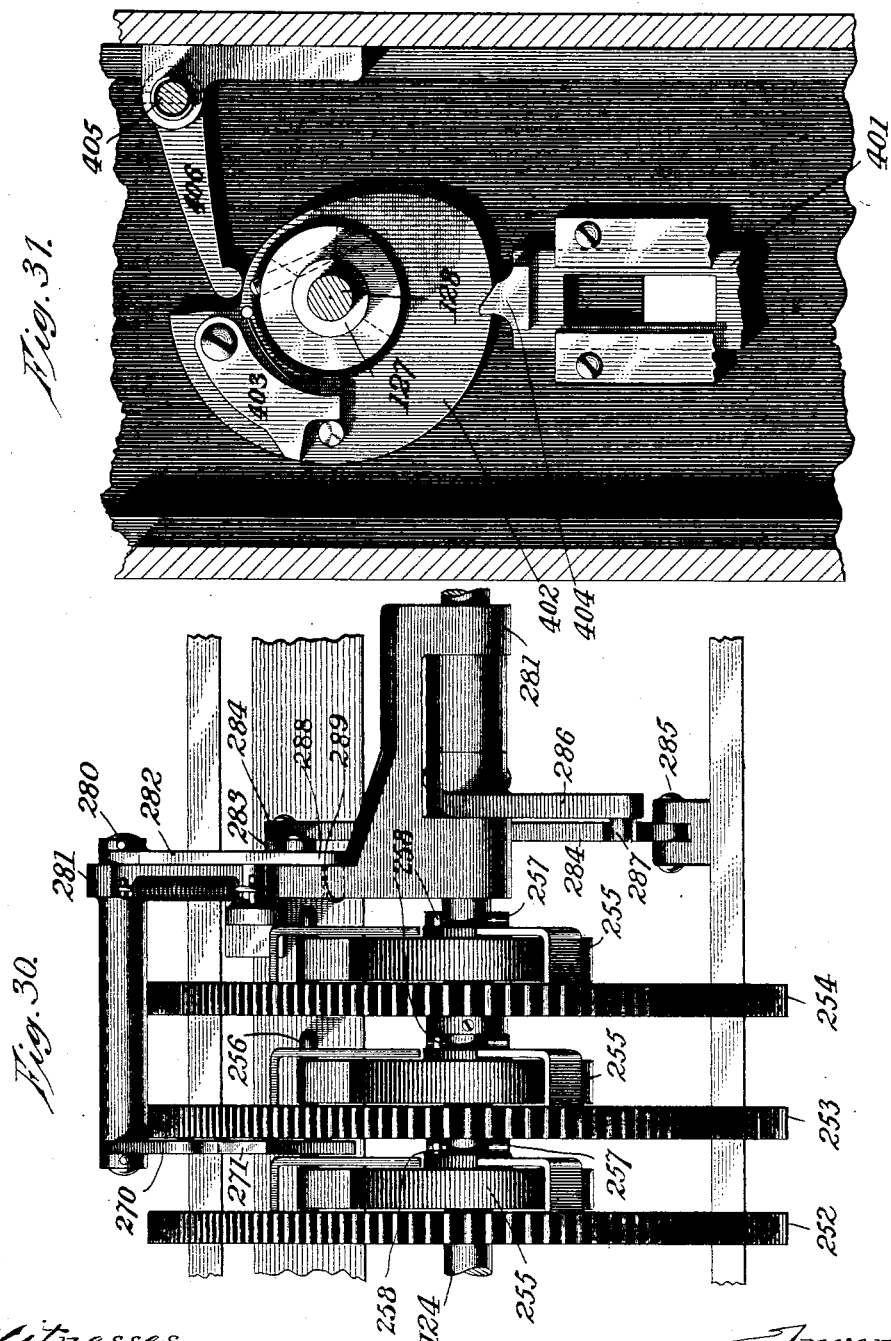

B. M. DES JARDINS.
MACHINE FOR WEIGHING, COMPUTING, INDICATING, AND RECORDING.
APPLICATION FILED NOV. 25, 1901.

1,184,330.

Patented May 23, 1916.
19 SHEETS—SHEET 14.

B. M. DES JARDINS.
MACHINE FOR WEIGHING, COMPUTING, INDICATING, AND RECORDING.
APPLICATION FILED NOV. 25, 1901.

1,184,330.

Patented May 23, 1916.
19 SHEETS—SHEET 15.

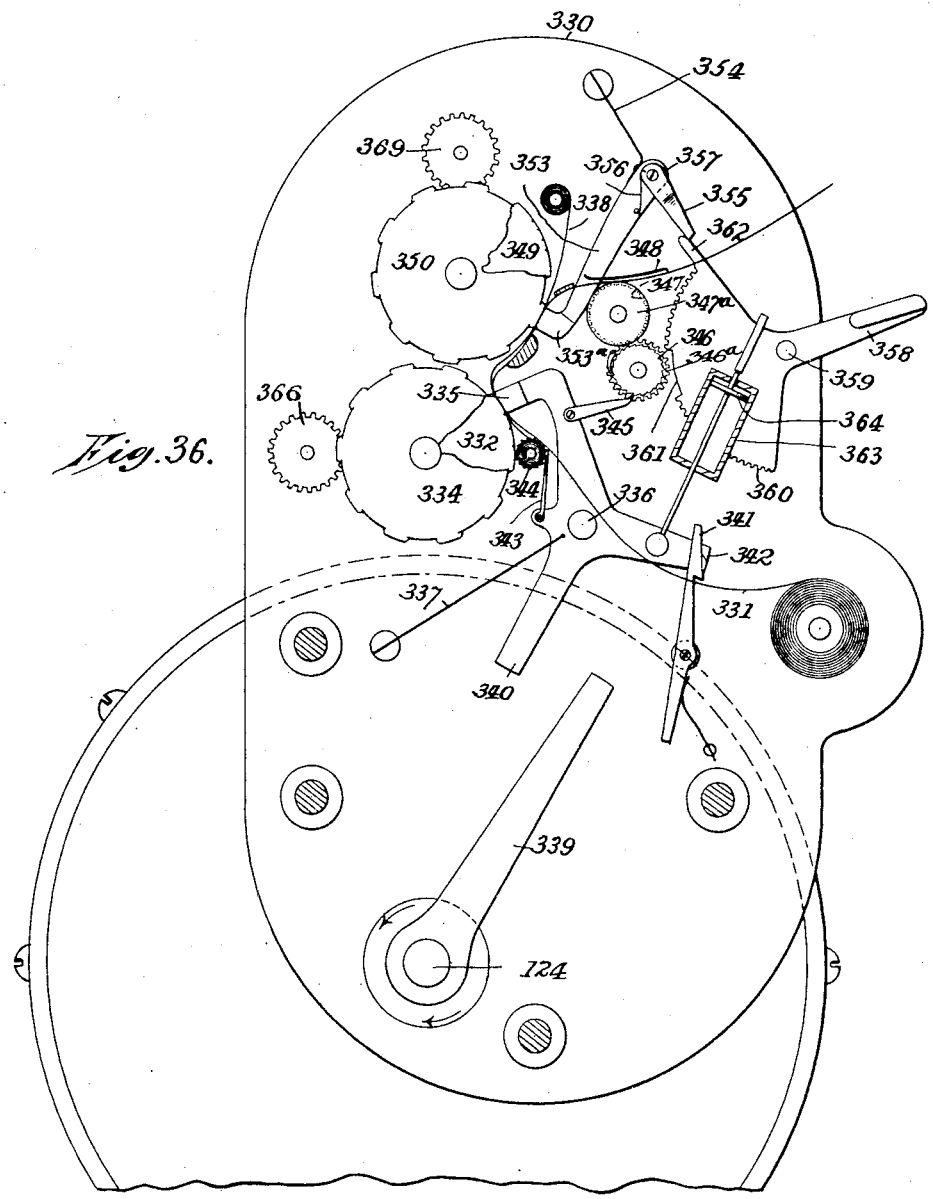

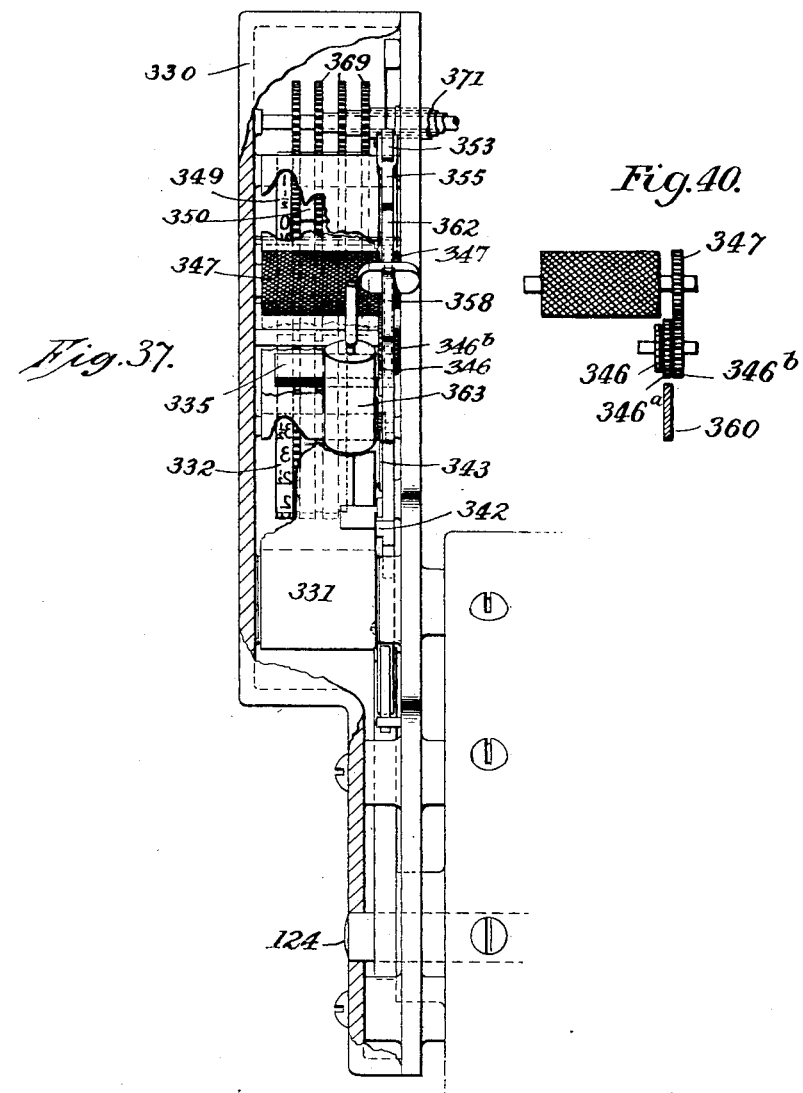

B. M. DES JARDINS.
MACHINE FOR WEIGHING, COMPUTING, INDICATING, AND RECORDING.
APPLICATION FILED NOV. 25, 1901.
1,184,330.
Patented May 23, 1916.
19 SHEETS—SHEET 18.
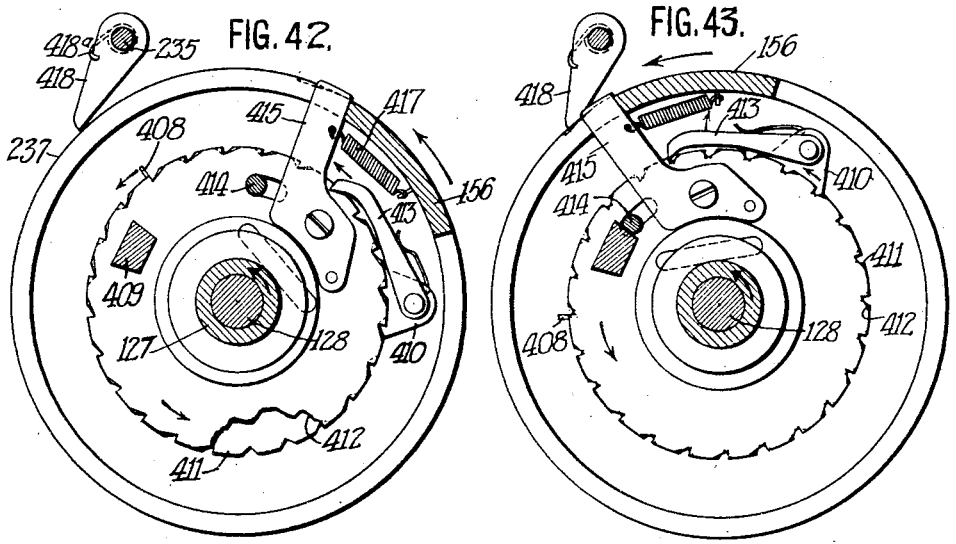
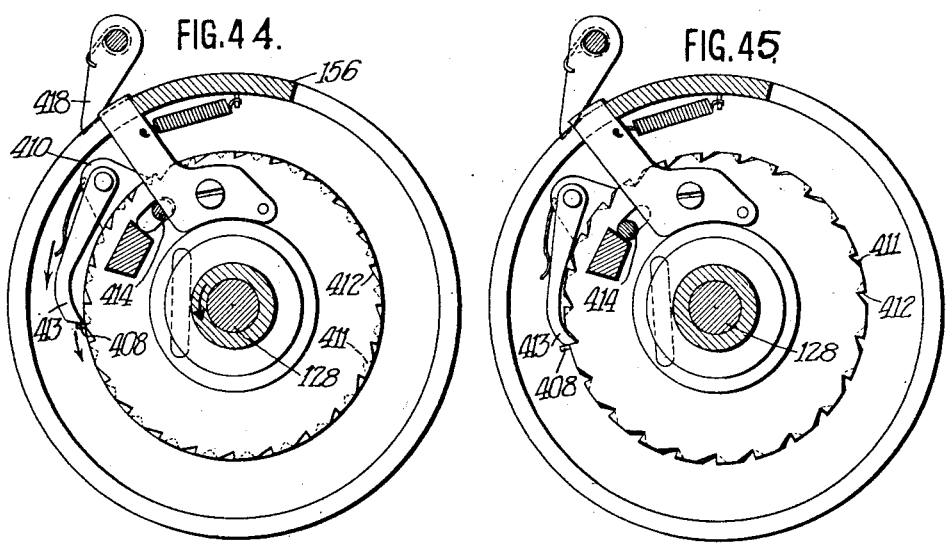

B. M. DES JARDINS.
MACHINE FOR WEIGHING, COMPUTING, INDICATING, AND RECORDING.
APPLICATION FILED NOV. 25, 1901.
1,184,330.
Patented May 23, 1916.
19 SHEETS—SHEET 19.
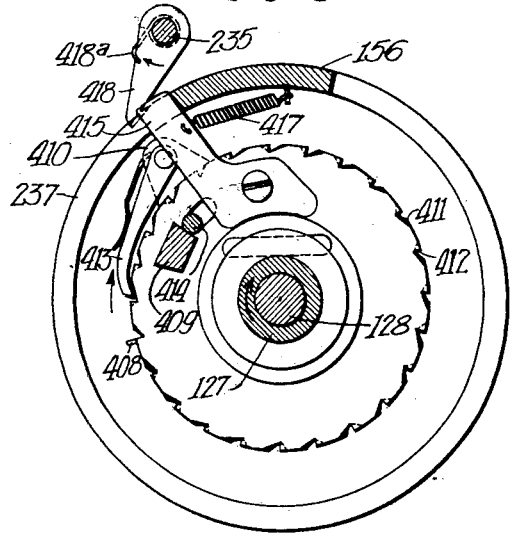
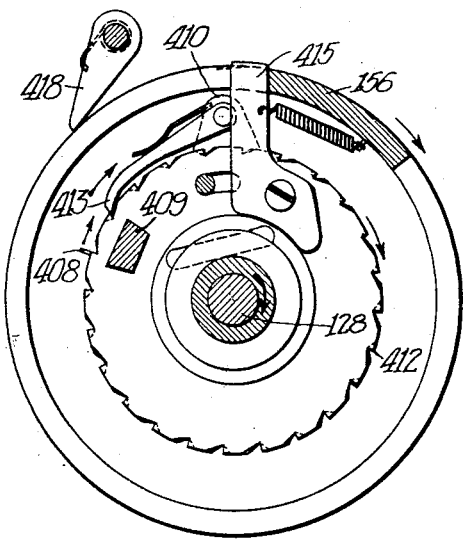
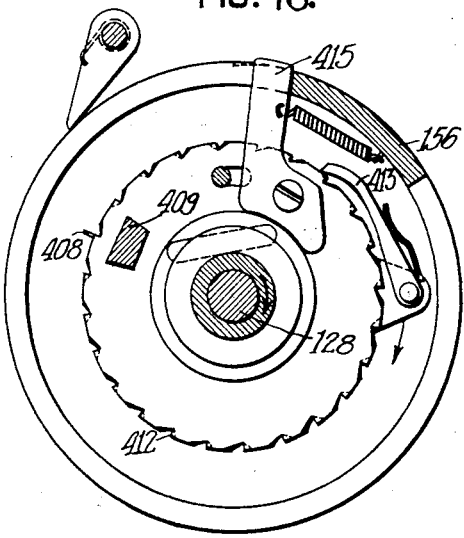
WITNESSES:
INVENTOR:
Benjamin M. Des Jardins
BY
ATTORNEY.

UNITED STATES PATENT OFFICE.

BENJAMIN M. DES JARDINS, OF WEST HARTFORD, CONNECTICUT.

MACHINE FOR WEIGHING, COMPUTING, INDICATING, AND RECORDING.

1,184,330.       Specification of Letters Patent.       Patented May 23, 1916.

Application filed November 25, 1901. Serial No. 83,624.

*To all whom it may concern:*

Be it known that I, BENJAMIN M. DES JARDINS, a citizen of the United States, residing at West Hartford, in the county of Hartford and State of Connecticut, have invented certain new and useful Improvements in Machines for Weighing, Computing, Indicating, and Recording, of which the following is a specification.

This invention comprises a machine designed to perform mechanically and accurately the computations performed mentally and executed with pencil and paper by clerks in grocery, hardware and other stores where commodities are sold by weight. Some features of the invention are also applicable to automatic weighing machines and to various forms of computing, registering and recording machines.

In the embodiment of the invention illustrated and described there is a scale whereon any commodity may be weighed. The weight of the article or material placed upon the scale effects or controls adjustment of a member or members of the computing mechanism, and to avoid complication as much as possible it is preferred to transmit the elements, pounds and ounces, of such weight independently to said member or members. The price per pound is indicated by depressing keys representing cents, dimes and mills. The price elements are also dealt with separately and after the elements of weight are multiplied thereby they are suitably reseparated and displayed. After the scale is adjusted to balance the article and the price per pound has been indicated by the keys a handle is moved to drive the mechanism. Certain parts of the mechanism mechanically represent the weight of the article, other parts mechanically represent the price per unit of weight, and intervening mechanism combines the price per unit with the weight, producing a resultant mechanical representation of the total price of the article. This mechanical representation is used to control an indicator which indicates the price and a printing mechanism which prints it on a slip of paper. A second indicator exhibits the total price of all the items sold to a customer and a second printing device prints the total at the foot of the column of items upon the slip. A third indicator is provided for a continuous record of the operations of the machine. In addition to the foregoing indicators an indicator is provided to exhibit in plain figures the weight in pounds and ounces and another indicator to exhibit the price per unit which has been indicated on the key board.

It will be seen that I use as a part of my invention an ordinary weighing scale with a beam and poise. The article to be weighed is placed on the scale in the ordinary manner and the amount of the weight of the article is determined by causing the lever of the scale to balance, suspended by its fulcrum through the employment of a counter weight on the scale beam. This counter weight is employed in the ordinary way either by adjusting a uniform weight along the scale beam or by suspending weights of different hefts on the beam itself, each of these methods being a well known equivalent of the other.

In order to carry out the underlying elements of my invention, that is, to deal separately with the ounces and pounds and to separately communicate them to their respective indicators in the machine, I have in this construction kept the means for determining the ounces separate and this is accomplished by the regular graduations along the scale beam, and in a like manner I have arranged the mechanism so that the number of pounds is determined and communicated to the respective indicators from the poise which is connected to the extreme end of the beam. In a similar manner I have arranged the price mechanism so that the keys having indicators representing mills communicate directly to a mills mechanism which in turn indicates by means of a specific indicator the total number of mills in the price. In a like manner keys having indexes thereon are provided respectively for the cents and dimes and these through their respective mechanisms indicate on their respective indicators the total number of cents and dimes in the price per pound. The machine being provided with these two respective sets of indicators, that is one set for the elements of the weight and another set for the elements of the price at the proper time during the operation, the dimension or dimensions of the indicators representing the one is multiplied by the dimension or dimensions representing the elements of the other and the total is combined and indicated on a third set of indicators which displays the total price of the article that is being weighed. Of course this applies to normal examples only, that is, when there is both actual weight and actual price, because in cases when there is no weight or no price it is very clear that there would be no value and consequently no action in the machine sufficient to communicate a price to the third set or price indicators.

The invention will now be described in detail, reference being had to the accompanying drawings in which—

Figure 33:
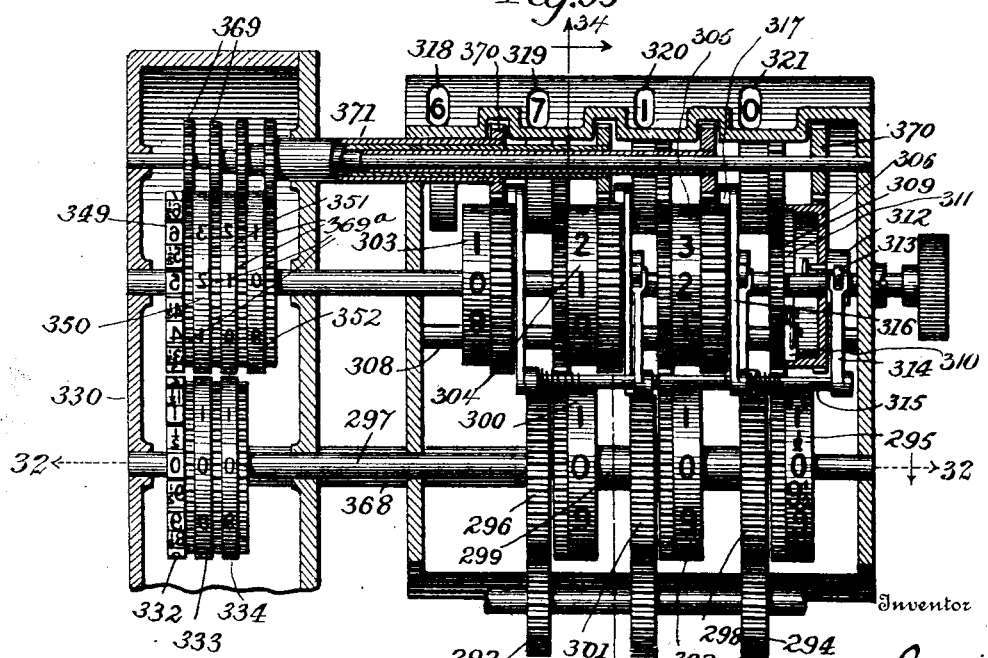
Figure 34:
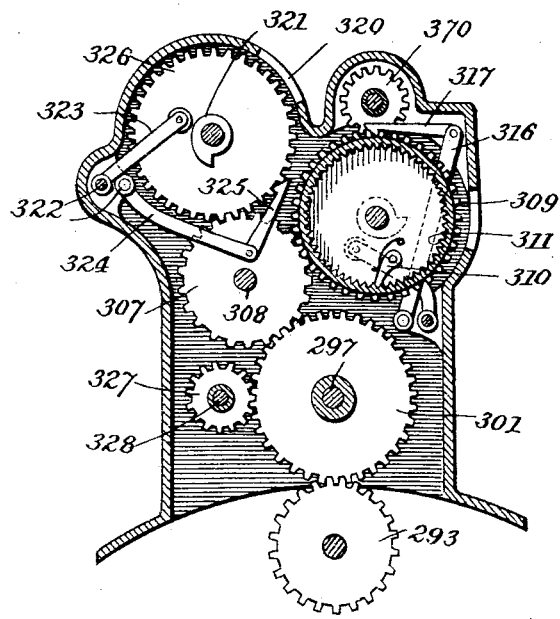
Figure 35:
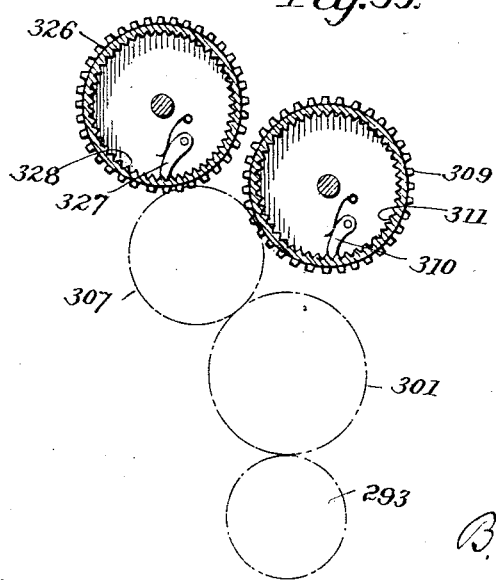

Figure 1 is a front view of the entire machine; Fig. 2 is a right end elevation; Fig. 3 is a left end elevation, the printing mechanism being removed; Fig. 4 is a detail of the device for controlling the pound weights; Fig. 5 is a front elevation, the casing being broken away and the scale removed to show the interior; Fig. 6 is an enlarged detail of devices illustrated in Fig. 5 for computing the ounces; Fig. 7 is a section on the line 7 of Fig. 6; Fig. 8 is a plan of the devices shown in Fig. 6; Fig. 9 is a sectional elevation about on the line 9 of Fig. 14; Fig. 10 is a detail of a part shown in Figs. 1, 2 and 5; Fig. 11 is a vertical section about on the line 11 of Fig. 5; Figs. 12 and 13 are details; Fig. 14 is a section on the line 14 of Figs. 1 and 5; Fig. 15 is an enlargement of part of Fig. 9; Fig. 16 is a section on the line 16 of Fig. 15; Fig. 17 is an end view of parts shown in Figs. 15 and 16; Fig. 18 is a vertical section about on the line 18 of Fig. 5; Fig. 19 is a section on the line 19 of Fig. 18; Fig. 20 is a section on the line 20 of Figs. 18 and 19; Fig. 21 is a view looking in the direction of the arrow 21 of Fig. 22; Fig. 22 is a view looking in the direction of the arrow 22 of Fig. 21; Figs. 23 to 27 inclusive are details of parts shown in Figs. 21 and 22; Fig. 28 is an enlargement of part of Fig. 9; partly on the line 28 of Fig. 28$^a$; Fig. 28$^a$ is a plan view of the stepped cylinder shown in Fig. 28; Fig. 28$^b$ is a plan of part of Fig. 28; Fig. 29 is an enlargement of part of Fig. 9; Fig. 30 is an enlargement of part of Fig. 5; Fig. 31 is a detail part of the releasing devices; Fig. 32 is a section on the line 32 of Fig. 33; Fig. 33 is an enlargement of part of Fig. 9; Fig. 34 is a section on the line 34 of Fig. 33; Fig. 35 is a sectional view about on the line 34 of Fig. 33; Fig. 36 is a side elevation of the recording mechanism; Fig. 37 is a front view of the recording mechanism, parts being broken away; Fig. 37$^a$ is a section of Fig. 10; Fig. 38 shows the plates 411 and 412; Fig. 39 is a section of Fig. 38; Fig. 40 is a detail of Fig. 37; Fig. 41 shows an expanding device extended; Figs. 42 to 48 are details of the wheels 411, 412, and connected parts in various positions; Fig. 42 shows the parts when the handle is near its forward or normal position, having just started on its rearward motion; Fig. 43 shows the parts when the handle 120 has moved farther toward its rearward position. In Fig. 44, the handle has almost reached its rearward position. In Fig. 45 the handle 120 is at its rearward position. In Fig. 46 the handle has left its rearward position and has moved a short distance forward. In Fig. 47 the handle is farther on its forward stroke. In Fig. 48 the handle has almost reached its forward position.

The various parts of the machine are mounted on a suitable base and frame and suitably incased. The scale proper is of ordinary construction, comprising a beam 100 and a flat form 102 supported on a standard 101 in the usual manner. The scale illustrated in the drawing is adapted to weigh any amount up to five pounds. The beam is graduated for ounces and fractions of an ounce as usual and there is a weight or poise 103 arranged to slide upon it. The poise is provided with a mark adapted to aline with the graduations on the beam and is shown at the zero position. It is adjusted for the ounces and fractions of ounces by a slide 104 to which it is connected by a link 105. A lever 106 has a slot 107 which is engaged by a pin 108 on slide 104. The lever is thus moved in accordance with the number of ounces at which the poise 103 is set. The lever 106 is connected to the computing mechanism in the manner to be hereinafter described.

A rod 109 depends from and has a swivel connection with a block 110 suspended on the end of the beam 100. A series of weights or counterpoises 111 are normally supported on a pair of posts or standards 112 arranged on opposite sides of the rod 109. The depending rod 109 is normally free from these weights and mechanism is provided for engaging one or more of the weights with said rod, depending upon the number of pounds to be weighed, each of the weights or counterpoises representing one pound. The manner of engaging the pound weights with the scale beam is as follows: Each of the pound weights has notches which embrace the posts 112 and the weights normally rest upon pins 113 on said posts. The weights are cut away centrally as shown in Fig. 20 and fixed on the depending rod 109 are a series of three-armed disks 114, the arms or prongs of which pass freely through the opening in the weights when less than one pound is to be weighed. By turning the rod 109 the arms on the disks 114 are brought into position to pick up one or more of the weights, depending upon the number of pounds to be weighed. Certain weights 115 are permanently connected to rod 109 to counterbalance the platform and its connections.

To the rod 109 is connected a lever 116 which is set by means of a dial 117 to indicate the number of pounds to be weighed. The lever 116 carries a pair of yokes 129 in which a pin 130 slides, said pin passing transversely through the rod 109. This permits the lever to turn the rod 109 without interfering with its vertical movement. The lever is preferably provided with a pin 118 which engages depressions or notches 119 at the pound marks to hold the lever in adjustment. When the lever is turned to the one pound mark it turns the rod 109 so that it will, when raised by the scale beam, pick up one of the pound weights 111. When set at the two pound mark it will pick up two of the pound weights, etc. The lever 116 may be flexible and the pin 118 fixed to it.

*Computing mechanism.*—The computing-mechanism is set to correspond to the number of pounds and ounces to be weighed automatically by connections with the pound index lever 116 and the ounce slide or counterpoise 103. These elements of weight are dealt with independently. Either before or after setting the counter-poises the keys representing separate elements of the price per pound, that is, the dimes, cents and mills, are manipulated. The computing mechanism is then operated by a hand lever 120 and the weight of the material is multiplied by the price automatically and the result indicated visibly and also printed to make a permanent record.

On the right side of the machine is a handle 120 connected to two segmental gears carried on a common hub 121. The upper gear 122 meshes with a pinion 123 fixed on a shaft 124. The lower gear 125 meshes with a pinion 126 connected to a sleeve 127 which is free to rotate on a shaft 128 (Figs. 2 and 9).

On the rear of lever 116 is a pin 131 which passes through a cam slot 132 in a blade 133 which is connected to a vertically moving slide 134 (Figs. 5 and 18). Slide 134 is pivotally connected to a pin 135 which is fixed upon the arm 136 of a rotating disk or ring 137. Said ring has a depression 138 extending along a small portion of its periphery and terminating in inclined ends for a purpose to be presently described. Upon the outer end of sleeve 127 is a disk 140. The ring 137 is mounted to rotate on the inside of the disk 140 and on the outside of said disk is mounted a second ring 141 (Figs. 2, 5, 9 and 10). Ring 141 carries a pawl 142 which is spring pressed into engagement with the intermediate disk 140 and in certain positions engages a notch 140ª in said disk as shown in Fig. 10. On the lower side of ring 141 is an arm 143 having an inclined cam surface 144. When the handle 120 is turned the intermediate disk 140 is positively rotated and said disk carries the ring 141 with it by means of the pawl 142 until said pawl is thrown out of engagement with the disk 140 by riding over the cam edge of the notch 138, Fig. 10. With the exception of the cam 138 the ring 137 is of the same diameter as the intermediate disk 140. It will thus be seen that when the handle 120 is rocked in one direction the ring 141 and the cam 144 are moved through a part of a revolution, the amount of movement depending upon the number of pounds to which the pound lever 116 is set. The cam 144 pushes to the left all of the slides 145 less a number corresponding to the number of integral pounds, and these slides in turn rock levers 146 which in turn move to the left corresponding slides 147. Slides 147 are supported on pins 148 which pass through inclined slots 149 whereby the slides are moved downward as they move to the left. The slides 147 are normally held in their lowest and left-hand positions by the high part of cam 144, against the tension of springs 150 which connect the levers 146 with a fixed part 151. (Figs. 9 to 17 inclusive.)

Between two fixed guides 152 are a series of four slides 153 which interlock respectively with the slides 147 and move up and down with said slides. Slides 153 are, however, free to move longitudinally in the guides 152 and relatively to the slides 147. Upon each of the sliding blocks 153 is a fixed pin 154 and a raised portion 155, the functions of which will be explained hereinafter.

The rocking of the sector gear 125 rotates the sleeve 127 which is mounted loosely on shaft 128. Upon the shaft 128, which is free to rotate in said sleeve, is a disk 156 (Figs. 9 and 11). To the periphery of this disk is connected one end of a spring 157 the inner end of the spring being connected to a hub 158 fixed on sleeve 127. It will therefore be evident that the shaft 128 will tend to follow the movements of the sleeve 127, being coupled thereto by the intermediate spring 157. To the left of disk 156 is a square shaft 159 which is integral with and a continuation of the shaft 128 (Figs. 9, 15 and 16). On shaft 159 is a series of devices *a* which expand and contract in aggregate length in proportion to the number of integral pounds being weighed, multiplied by the price per pound. There is one of these individual devices for each pound in the capacity of the scale. Each of these expanding devices comprises a hub 160 threaded on a part of its exterior surface and having a square axial opening through which the shaft 159 passes. The hub must therefore turn with the shaft although it is free to slide upon it. On each hub is a loose collar 161 having a groove 162 which is engaged by the pin 154 on corresponding slide 153. The collars 161 are adapted to allow the hubs 160 to turn within them but do not slide longitudinally thereof. On each hub is also a ring 163 having an internal thread fitting the thread of the hub 160. The collar 161 and the ring 163 are connected together against independent rotation by pin 164 leaving them free to separate laterally. In each hub is a notch 165 into which one end of a pawl 166 tends normally to enter by reason of the pressure of the spring 167 on the tail of the pawl. The pawl 166 is mounted in a groove 168 in the ring 163 and pivotally connected to said ring. The pawl 166 is normally held in engagement with notch 165, but it is swung out of engagement by the projection 155 on its corresponding slide 153. When a one-pound weight is indicated by the pound lever 116, three of the slides 147 remain lowered and the corresponding pawls 166 lock hubs 160 and rings 163 together. At the same time the three projections or webs 155 remain withdrawn from the grooves 168 permitting the three hubs, rings and collars to rotate freely together as the shaft 159 is turned.

In performing each computation the shaft 159 turns an amount proportionate to the price per pound as will be explained hereinafter. If there are no full pounds each of the slides 147 will remain lowered and all of the hubs 160 will remain locked to the rings 163 and said hubs and rings will turn with the shaft. The series of expanding devices will therefore remain of the same length. If, for instance, three pounds of material are being weighed, but one of the slides 147 will remain lowered and one ring 163 will remain locked to its hub. The hubs will be free to revolve within the other rings, the rings being prevented from rotating by projections or splines 155. The effect of this arrangement will be that the rotation of the hubs will separate each ring 163 from its collar 161 an amount proportionate to the rotation of shaft 159, that is, proportionate to the price per pound, and the total length of the series of expanding devices $a$ will be increased by an amount proportionate to the price multiplied by the number of pounds being weighed.

Devices are provided which coöperate with the pound expanding devices $a$, adding to the effective length of said devices an amount equal to the number of ounces measured on the scale beam multiplied by the price, as follows: Referring to Figs. 1, 5 and 14, the ounce lever 106 is connected to a rock shaft 169 and an arm 170 on said shaft is connected by a link 171 with an elbow lever 172 pivoted at 173. Lever 172 has a substantially horizontal arm 174 which raises and lowers a slide 175 through a U slide 174ª (Figs. 6, 7 and 8). Said slide 175 travels on a vertical bar 176, said bar being adapted to move laterally or horizontally. As shown the bar 176 is connected to a horizontal slide 177 and the two are united by a brace 178. On slide 175 is a rotatable contact piece 179 one-half of the forward end of which is cut away to form a flat bearing 179ª extending through its center leaving it free to pass downward till concentric with a coacting pivot 181. This flat bearing bears constantly upon a pivoted computing bar 180, the left edge of which is radial to the center of its pivot 181. The pivot 181 is fastened to the frame in front of it, leaving an open passage for slide 175 and piece 179 between its flange 181ª and bar 176. The normal position of the computing bar is vertical and it is moved to the left from this position in proportion to the price. To effect this movement or result the bar 180 is provided with a slide 182 which it engages and which carries a pin 183 engaging a spiral flange or cam 184 on the disk 156 (Fig. 5). The slide 176 carries a projection 185 which engages the right end of the series of pound expanding devices $a$ and forms an abutment against which said devices rest when pressed to the right (Figs. 8 and 14). The two sets of expanding devices just described, one acting as the representative of pounds and the other as the representative of ounces, stand in the machine in place of these weight elements, in readiness and with the capacity to be acted upon by a mechanical representative of the unit price, and with the aid of the price indicating devices are able to assume another form which mechanically expresses the total price sought for. The method by which this is accomplished is somewhat as follows: The inclined surfaces comprised in the threads of the hubs 160 and the surface of the computing bar 180, measured from their used position to their initial points, represent a specific product resulting from the multiplication of the weight by the price. In the case of hubs 160 inclines are combined, and of the bar 180 the incline is increased. In each case this change represents the increase or change of the multiplicand from one amount to another; while the change which takes place in the other direction, that is, by the rotation of the hubs 160 or the movement of the center piece 179, represents the amount of the multiplier. The machine in this manner has provided, within its range, dimensions representing all the possible required products of one set of numbers multiplied by another.

The operation of the ounce expanding devices is as follows: The block or slide 175 is shown in midposition in Fig. 6, in which position it corresponds to eight ounces on the beam. When there are no ounces the pivot 179 is moved down until it is concentric with pivot 181 of the computing bar. When in this position the movement of the computing bar due to the cam 184 does not communicate any movement to the slide 176 and therefore does not change the abutment 185 of the expanding devices. As the pivot or contact piece 179 is raised along the bar 180, now inclined leftward by the action of cam 184, the movement of the computing bar is transmitted to the slide 176 in proportion to the distance of the contact piece 179 from pivot 181, that is, in proportion to the number of ounces indicated on the beam. The movement of the computing bar 180 is in proportion to the price, that is, in proportion to the rotation of shaft 159 and the movement of the slide 176 and the abutment 185 is therefore in proportion to the price multiplied by the number of ounces.

The devices above described constitute means for moving the left end of the series of expanding devices a in proportion to the number of ounces multiplied by the price. The manner of causing this movement to indicate the total price in figures will be described hereinafter. The devices upon which the price is indicated and which limit the rotation of shaft 159 will be now described.

*Price mechanism.*—The price is indicated by suitable price indices which in the particular embodiment of the invention illustrated consist of a series of keys much the same as those employed in a certain class of cash registers. As shown there are three rows of keys 186, 187 and 188 corresponding respectively to mills, cents and dimes and by means of which any price less than one dollar can be indicated in cents and mills. The keys are arranged radially to a shaft 124 and mounted in a casing 190 concentric with said shaft. Each of the keys is movable longitudinally. Each key stem 191 has a rectangular locking notch 192 and a deeper notch 193 into which the locking plate 194 moves when the key is in its normal raised position. The upper wall of notch 193 is an incline 195 adapted when a key is depressed to throw the locking plate out of engagement with any keys of the series previously depressed. Thus the depression of any key releases all other keys of the series. The keys are raised, when released, by springs 196. Beneath each key is a stop pawl 197 which is normally raised by its spring 198. The pawl is limited in its movement by fixed pins 199. These pawls are pivotally mounted on flanges 200 of the casing 190, Fig. 22.

On the shaft 124 are gears 201, 202 and 203, one corresponding to each of the series of price keys (Figs. 5, 9, 21, 22 and 29). These gears are loose on the shaft and to the hub of each gear is connected one end of a spiral spring 204, the other end being connected to a fixed part 205. The gears are moved backward when the handle 120 is moved backward by means of pins 206 in the shaft 124 which engage pins 207 on the hubs of the gears. This movement winds the springs 204 and gives the gears the tendency to move forward when permitted by the forward rotation of the shaft. On each gear is mounted a plate 208 to which is pivoted a pawl 209 adapted to engage the stop pawls 197. Pawl 209 has a pin which enters a slot 210 in plate 208 to limit its movement and a spring 211 to normally throw it outward into position to engage the stops. Plate 208 is also provided with a fixed shoulder 212 which engages with a zero stop 213 when none of the digit keys is depressed. The zero stop is a slide which is operated by an elbow lever 214 one arm of which is in engagement with the locking slide 194. The zero stop is given a tendency to move inward by a spring 215. When none of the keys are depressed the locking slide 194 rests in the lower notches 193 which are deep enough to permit spring 215 to throw slide 213 into the path of the shoulder 212. In such case, if the gear be moved backward it will be retained in its rearmost position by the engagement of stop 213 with shoulder 212. If, however, any one of the digit keys is depressed and the gear is moved backward its spring will throw it forward until pawl 209 engages the stop corresponding to the depressed key. In operating the parts above described it is to be understood that the three keys corresponding to the price are first operated, in case there is no cipher in the price and three stop pawls are thus depressed and locked down. The handle 120 is then pushed rearward which turns the gears backward against the tension of their springs. On pulling the handle forward the gears move forward under the tension of the springs until they are intercepted by the depressed pawls 197. In this way the three gears are set in positions corresponding to the dimes, cents and mills in the price. If there is a cipher in the price no corresponding key is depressed and the cipher stop 213 automatically holds the corresponding gear in its proper position. When the handle 120 is drawn to its foremost position a lever 216 carried on an arm 217 which is fixed on said shaft strikes the tail of a lever 218 which pulls inward a slide 219. A shoulder 220 on this slide engages one of three elbow levers 221, fixed on rock-shaft 221ª one arm of each lever 221 engages a locking slide 194. On completing the forward movement of the handle 120 all of the depressed price keys are released and restored to their inoperative positions automatically.

Below the shaft 124 and concentric with the hub 121 is a shaft 222 and concentric with said shaft are three pinions 223, 224 and 225 in mesh respectively with the gears 201, 202 and 203. These gears and their connected parts constitute an expanding device $b$ which expands in proportion to the price. The gear 223 has a threaded opening which engages a thread 226 on shaft 222. The gear 201 rotates pinion 223 an amount corresponding to the number of mills in the price and the pinion travels to the right according to such amount. As shown there is a cylindrical block 227 connected to the pinion and a ring or washer 189 adjacent thereto, which forms a spacer for the expanding device $b$. It will be understood that the shaft 222 does not revolve. Splined on shaft 222 is a sleeve 228 free to slide but not free to revolve on said shaft. The collar 229 is threaded on said sleeve, said collar being connected by screws to pinion 224. The thread connecting the collar and the sleeve has ten times the pitch of the thread 226 and hence when pinion 224 is turned through a revolution it moves laterally on said sleeve an amount corresponding to the cents column of the price. The sleeve 228 is pressed constantly into engagement with the part 189 by the spring $222^a$ and hence the movement of collar 229 on its screw is added to the movement of the block 227. The movement of collar 229 axially of the shaft 222 is communicated directly to pinion 225, said collar abutting against a ring 230 attached to the said pinion. Instead of moving the pinion 225 in proportion to the dimes in the price, which would require a considerable movement along the shaft 222, a cylindrical part 231 is connected with the pinion 225, said part being provided with a series of steps 232 corresponding respectively in their location with the digits in the dimes column. That is, the first step corresponds to one dime, the second step to two dimes and so on. The rotation of pinion 225 brings the step corresponding to the dime key depressed into operative relation with a stop 233 on a slide 234 moving in ways 235 parallel with the shaft 222 (Figs. 5, 11 and 29). It will be seen that the mechanism heretofore described brings a step 232 corresponding to the dime key operated into the path of stop 233 and that said step 232 is also located longitudinally of the shaft 222 according to the number of cents and mills indicated on the key board. In other words the expanding device $b$ has been arranged to indicate the price. The expanding device $b$ is now made to limit the rotation of the shaft 159 and thus to effect the multiplication of the pounds and ounces by the price, thus producing an expansion of the devices $a$ corresponding to the result.

Connected to the disk 156 and rotating with said disk and the shaft 159 is a cylindrical surface 236 having a spiral cam groove 237 in which engages a projection 238 on slide 234 (Figs. 5, 9, 11 and 29). As the sleeve 127 turns the shaft 159 follows by reason of its connection through the spring 157. The same movement rotates the cam groove 237 and moves the slide 234 to the left until it engages the operative stop or step of the expanding device $b$. By reason of this stop the rotation of shaft 159 is arrested after it has turned an amount corresponding to the price indicated on the key. The manner in which the rotation of 159 due to the price is multiplied into the pounds and ounces to expand device $a$ to produce the result has been heretofore described. Next in order comes the interpreting device which indicates in figures the result of this multiplication, that is, the total price required.

In line with the fixed shaft 222 is another fixed shaft 240 on which is a third expanding device $c$ constructed similarly to the expanding device $b$ but differing therefrom somewhat in its proportions and in its mode of operation. The device $c$ comprises a pinion 241 connected to a collar 242 which has a threaded opening engaging a thread 243 on the shaft 240 (Figs. 5, 9 and 28). A sleeve 244 is arranged to slide without turning upon the shaft 240 similar to the sleeve 228. Sleeve 244 has a threaded exterior on which turns a ring 245 connected to a pinion 246. Between the sleeve 244 and the ring 242 is a washer or spacing piece 247. A third pinion 248 is arranged to turn freely on the shaft 240. Connected to the left side of the pinion 248 is a flanged ring 249 which abuts against the ring 245 and connected to the right side of the pinion is a hub 250 on which is fixed a stepped cylindrical part 251 similar in construction to the part 231 but differently arranged and proportioned. The pinions 241, 246 and 248 are respectively in mesh with gears 252, 253 and 254 (Figs. 5, 9 and 30). These gears are mounted with freedom to turn on the shaft 124 and are rotated in one direction by spiral springs 255. These springs are connected at one end to fixed parts 256 and at the other end to the hubs of the gears. On the shaft 124 are pins 257 which engage projections or pins 258 on the several gears 252, 253 and 254 to turn the gears backward. When the handle 120 is pushed backward the springs 255 carry the gears around backward with the shaft bringing the parts into the position shown in Fig. 5 in which position they are temporarily locked as will be hereinafter explained. When the handle is pulled forward the gears and pinions are under tension to rotate and when released they rotate forward until they are stopped by the engagement of the cylindrical stepped part 251 with a stop 259 on the slide 260 moving in a fixed guide 260ᵃ (Figs. 5, 9, 15 and 28). Slide 260 has a downwardly projecting abutment 261 which engages the left end of the expanding device a. The slide 260 is operated by hand lever 262 at the right side of the machine, arm 263 loose on rock shaft 264, spring 269 connecting said arm and rock shaft, arm 265 fast on rock shaft 264, link 266, lever 267 and link 268 connecting said lever with the slide (Figs. 2, 9, 15 and 18). Lever 267 is pivoted at 267ᵃ (Fig. 9). Slide 260 is normally held in its left hand position by the spring 269. The stop 259 is capable of slight movement on the slide 260, being normally held in its left hand position by a spring 259ᵃ. Its rear end is beveled and it coöperates with reversely beveled teeth 251ᵃ on the stepped block 251, one of these teeth being located on the edge of each step. As the expanding device c opens one or other of the teeth 251ᵃ engages the stop 259 and moves it to its right hand position in the slide 260. When it reaches this position the expansion of the device c is positively limited and the total price of the article indicated, as elsewhere explained. The stop 259 thus limits the rotation of the stepped part 251 and also its longitudinal movement due to the expanding device c.

The arm 263 of shaft 264 (Fig. 9) has a toe or projection 400 which engages and moves downward a slide 401 (Figs. 2, 5 and 31) when the thumb lever 262 is moved to the right. On the sleeve 127 just within the right end of the frame is a cam 402 carrying a stop pawl 403 in position to engage a stop 404 on the upper end of the slide 401 when said slide is in its normal elevated position. Upon a rock shaft 405 parallel with the shaft 128 is an arm 406 coöperating with the cam 402. The rock shaft 405 will be termed a "tripping" shaft as its function is to release several of the mechanisms in proper order. As the handle 120 is drawn forward it is stopped before completing its full stroke by the engagement of pawl 403 with the stop 404. At this point the operator draws out the thumb lever 262, drawing down the slide 401 and releasing the pawl 403, thus permitting the handle 120 to be drawn forward its full stroke.

The stepped cylinder 231 and the spiral cam 237 are restored to their initial positions during the backward movement of the lever 120 preparatory to making a new calculation. In some instances the cam 237 requires but a small backward movement to restore it to its initial position owing to its small forward movement in the preceding operation. Unless special provision is made to move the cam at the beginning of the movement of the lever 120 it would not begin its movement in such cases until the lever 120 almost completed its backward movement. Should this condition prevail the intermediate slide or interponent 234, would interfere with the backward movement or resetting of the cylinder 231. Devices are therefore provided by means of which the first part of the movement of lever 120 effects the restoration of the interponent to its initial or right hand position. Referring to Figs. 5, 9, 11, 38, 39, and 44 to 50, 410 indicates a crank which is rigid on the sleeve 127 and the hub 158. Adjacent to the crank are two notched wheels 411, 412, the notches of which register when alined. The teeth or spaces between the notches are of sufficient breadth to cover the notches when they are out of alinement giving the combined wheels a smooth peripheral surface. Upon the crank 410 is mounted a broad pawl 413 adapted to engage the notches in the wheels 411 and 412 when they are alined. The wheels 411, 412 have a limited relative movement, the wheel 411 having a pin 414 extending through a slot in wheel 412 and beyond the wheel 412 to contact with a fixed stop 409. On the outer wheel 412 is an arm 415 which extends into the path of the cylinder 236 connected with the cam piece 237 and which is connected with said cylinder by a spring 417. On the wheel 411 is an alining tooth 408.

Pivoted to the fixed guide 235 (Figs. 5 and 11) is a spring stop pawl 418 adapted to engage the part 236 which carries the cam 237 and holds the same in the position which it occupies when its spring 418ᵃ is under tension. An arm 419 of this pawl extends into the path of a tripping arm 420 on the trip shaft 405.

The operation of setting and releasing the cam 237 and interponent 234 is as follows. At the beginning of the backward movement of the handle 120 the pawl 413 stands in registering notches of the wheels 411, 412 and as the arm which carries the pawl is positively driven by the lever 120 the cam 237 and crank will move together, returning the cam to its initial position and moving the interponent 234 to its right hand position. When the cam and interponent are thus reset at their initial positions the pawl 418 engages and locks the cam, preventing it from returning until the pawl is thrown out of engagement by the trip shaft. At this time the pin 414 contacts with stop 409 and upon further movement of pawl 413 the tooth of wheel 411 throws the pawl out of engagement with wheel 411; the pawl then rotates wheel 412 out of register with wheel 411 which throws the pawl 413 out of engagement with both of said wheels and provides a smooth periphery upon which the pawl thereafter travels during the remaining movement of lever 120. By these means the interponent 234 is returned to its initial position at the beginning of the movement of lever 120 and is thus made to clear the stepped cylinder 231. When the pawl 413 is disengaged from wheels 411 and 412 the spring 417 draws wheel 412 back to its initial position with arm 415 against cylinder 236. Wheel 411 follows wheel 412 being engaged frictionally therewith. When pawl 413 has nearly finished its forward movement it engages the alining tooth 408 and moves wheel 411 into register with wheel 412 ready for the succeeding operation. The tripping of the holding pawl 418 takes place during the forward movement of the lever 120 as has been heretofore explained.

When the machine is in its normal position, the handle 120 stands in its forward position, which is a position similar to that in which the handle will be when moved in a clockwise direction from its position shown in Fig. 2. When the machine is in said normal position, the cylindrical cam 237 and the notched wheels 411, 412, may be in any position, corresponding to the article-price, in which they have been left in the previous computation. The arm 410, which is fast on the sleeve 127 and carries the pawl 413, stands in its extreme clockwise position corresponding to the extreme forward position of the handle 120. When the handle 120 begins to move rearwardly (Fig. 42) it transmits rotation through the segment 125, gear 126, and sleeve 127, to the arm 410 fast upon said sleeve. The notches of the wheels 411, 412, which are loose on the sleeve 127, being in register, the spring-pressed pawl 413 engages the notches of said wheels in its counter-clockwise rotation, which is imparted by a rearward rotation of the handle 120, and will impart rotation to the wheels 411 and 412 at the very beginning of the rotation of the arm 410 and pawl 413, since said pawl 413 is transmitting motion to said wheels 411, 412, owing to its engagement with the alined notches of said wheels 411, 412. Fast on the wheel 412 is an arm 415 which is connected to the cylinder 156 by a stiff spring 417.

At the beginning of the counterclockwise rotation of the arm 410, the spring 157, which supplies power to the cylindrical cam 237 formed on the cylinder 156, may be wound up, and contains sufficient stored power to rotate said cam further in clockwise direction from the position in which said cam had been left at the previous computation, depending on the magnitude of the price used in the previous computation. If a small price had been used in the previous computation, the spring 157 would have considerable power stored up, even after it has moved the cylindrical cam 237 a small angular distance, and may have less stored power when the cylindrical cam 237 has been moved a greater angular distance, corresponding to a higher price used in the previous computation. There will be at all times, however, regardless of the magnitude of the price used in the previous computation, some stored power in the spring 157 at the end of any previous computation, regardless of the position in which the cam 237 may stand at the completion of such previous computation. In order to move the slide 234 rightward before the stepped cylinder 231 begins to rotate toward its zero position, the cylindrical cam imparts a rightward sliding motion to the slide 234, at the very beginning of the backward movement of the handle 120. If the parts 411 and 412, and associated parts, were omitted, the handle 120 would have to be moved in a rearward direction a considerable distance directly proportional to the magnitude of the price used in the previous computation before the power in the spring 157 would be sufficiently spent in order to enable the cam 237 to rotate simultaneously with the handle 120. Before such rotation could take place, the handle 120 would have moved a sufficient distance to impart rotation to the stepped cylinder 231, which attempted rotation of the cylinder 231 would cause binding, since the cylindrical cam 237 not having rotated, its coacting slide 234 would be in the path of rotation of the stepped cylinder 231.

The counterclockwise rotation of the arm 410 will be transmitted (Figs. 42 and 43) to the cylindrical cam 237 through the pawl 413, wheel 412, arm 415 and spring 417, which spring is more powerful than the maximum residual power which may be found in the spring 157 at any time at the beginning of a computation. The counterclockwise rotation of the arm 410 will, therefore, be immediately transmitted to the cylindrical cam 237, and will therefore impart a rightward sliding motion to the slide 234 before the stepped cylinder begins to rotate. The stepped cylinder 231 does not begin to rotate until after the cylindrical cam 237 has started to rotate, since the pins 206 on the shaft 124, which is also driven by the handle 120, do not engage the pins 207 fast on the price wheels 201, 202, and 203 until the handle 120 has imparted a definite rotation to the cam 237, at which time the pins 206 will just engage the pins 207 if the price wheels should at that time stand at "9." If the price wheels, however, should stand at a lower number than 9, the cylindrical cam 237 will have a greater initial rotation before the pins 206 engage the pins 207, and therefore, before the stepped cylinder 231 begins to rotate. Further rearward movement of the arm 120 will cause a simultaneous counterclockwise rotation of the arm 410, notched wheels 411, 412, and cylindrical cam 237 until a pin 414 on the wheel 411 strikes a fixed obstruction 409, thus making further counterclockwise rotation of the notched wheel 411 impossible, but since the rotation of the wheel 412 remains unobstructed, the wheel 412 may be rotated farther in counterclockwise direction as long as its notch remains in engagement with the pawl 413. This it will do until the pawl 413 has been cammed outwardly to the periphery of the wheels 411 and 412 by an inclined surface of the notch in the wheel 411. This rotation of the wheel 412 after the wheel 411 has ceased rotating, moves the notches of the wheels out of alinement, so that the combined periphery of the wheels 411 and 412 forms a continuous surface, over which the pawl 413 may slide for a considerable distance without meeting any obstruction. This leaves the arm 410 free to rotate without imparting any further rotation to the cylindrical cam 237. At this time the cylindrical cam 237 has reached its extreme counterclockwise position, and has moved the slide 234 to its extreme rightward position, as shown in Fig. 9. The action of camming the pawl 413 out of the notches of the wheels 411, 412, is illustrated in Fig. 43. At the time that the pawl 413 is moved out of engagement with the notches of the wheels 411, 412, a recess in the cylinder 156 is brought under the retaining pawl 418, which is forced into said recess by its spring 418ª. This recess is formed so that its coaction with the pawl 418 will prevent a clockwise rotation of the cylindrical cam 237 until said pawl is raised out of its recess in the cylinder 156, so that the residual power of the spring 157 cannot cause a clockwise rotation of the cylindrical cam 237 when the pawl 413 has come out of engagement with the notches of the wheels 411, 412.

After the pin 414 fast on the wheel 411 strikes the obstruction 409, the rotation imparted to the wheel 412 while the pawl 413 is riding up on the incline of the notch of the wheel 411, causes a counterclockwise rotation of the cylinder 156 slightly beyond its counterclockwise position in which the pawl 418 would hold said disk 156, so that when the pawl 413 is moved entirely out of the notch of the wheel 412, the spring 157 within the cylinder 156 causes a slight return or clockwise rotation of the cylinder 156, until the recess in said cylinder will engage the pawl 418 (Fig. 44). This causes an equal clockwise rotation of the wheel 412, through the spring 417, and an equal rotation will be transmitted to the wheel 411 frictionally connected with the wheel 412, thus drawing away the pin 414 an equal angular distance from the obstruction 409 (Fig. 44), so that a further counterclockwise rotation may be imparted to the wheel 411 at the end of the rearward stroke of the handle 120, in order to re-aline the notches of said wheels 411, 412, then leaving the parts in the position shown in Fig. 45.

From this it will be clear that a further rotation of the handle 120 in rearward direction from the Fig. 43 position will cause pawl 413 to ride idly in counterclockwise direction over the combined periphery of the notched wheels 411, 412, until the end of the pawl 413 strikes a tooth 408 fast on the wheel 411 (Fig. 44). This takes place near the very end of the rearward movement of the handle 120. Further movement of the handle 120, after the pawl 413 has engaged the tooth 408, will impart a counterclockwise rotation to the wheel 411, while the wheel 412 is held stationary by the cylinder 156 through the spring 417. This counterclockwise rotation of the wheel 411, while the wheel 412 is stationary, will cause the notches to become re-alined. The beginning of this action is illustrated in Fig. 44, and the completion in Fig. 45. It will be noted that at the completion of this action, as illustrated in Fig. 45, the pin 414 on the wheel 411 has again been brought into contact with the fixed stop or obstruction 409. At this time, the cam 402 and connected parts have been brought to the Fig. 31 position, which corresponds to the extreme rearward position of the handle 120.

At the beginning of the forward stroke of the handle 120, a clockwise rotation is imparted to sleeve 127 and pawl 413 (see Fig. 46) which moves away from the tooth 408 and snaps idly over the notches in the wheels 411 and 412, until said pawl has moved a sufficient angular distance, when the pawl 418 will begin to rotate in clockwise direction out of the recess formed in the cylinder 156, to release said cylinder and cylindrical cam 237, and to cause a leftward motion of the slide 234. At the time the pawl 413 has moved said angular distance from its initial position in clockwise direction, the cam 402 (Fig. 31) has rotated a like angular distance, during which rotation it has swung the arm 406 fast on the shaft 405, on which shaft is fast an arm 420 (Fig. 11) which rocks the arm 419 to cause said pawl 418 to rotate in counterclockwise direction, so that a slight further rotation of the cam 402 will cause the pawl 418 to move out of the recess formed in the cylinder 156 to release said cylinder and cylindrical cam 237, so that clockwise rotation may be imparted thereto by the power of the spring 157. The position of the parts and action just before the cylindrical cam 237 is released by the pawl 418 is illustrated in Fig. 46. It will be noted on examination of said Fig. 46, that at this time, the end of the pawl 413 has moved slightly away from the abutting surface of one of the alined notches of the wheels 411, 412. By this time, the shaft 124 has moved a greater angular distance than the sleeve 127 and pawl 413. This initial rotation of the shaft 124 has caused the pins 206 to move away from the pins 207 fast on the unit-price wheels 201, 202, 203, and thus allowed the stored-up power in the springs 204 of the unit-price wheels to rotate said wheels and stepped cylinder 231 a sufficient angular distance to allow a free leftward sliding motion of the slide 234 from the time that the cylinder 156 carrying the cam 237 is released. This initial forward motion of the handle 120, which causes an initial clockwise rotation of the sleeve 127 and pawl 413, also winds the spring 157 during the time that the cylinder 156 is held stationary by pawl 418, to store up power to rotate the cylinder 156 and with it the cam 237 in clockwise direction when released by the pawl 418.

Immediately on the release of the cylinder 156 and cam 237 by the pawl 418, the cylindrical cam 237 is free to move clockwise under the influence of its spring 157, until the nearest notch on the wheel 412 (rotating clockwise from cylinder 156, spring 417 and arm 415) has caught up with the pawl 413 and has abutted against said pawl. Then the cylindrical cam 237, pawl 413, wheel 412 and wheel 411 (now connected to wheel 412 through pin 409) will move in clockwise direction simultaneously as illustrated in Fig. 47, until the slide 234 in moving leftwardly under the influence of cam 237 has struck one of the steps on the cylinder 231 corresponding to the unit-price set up in the present computation. At this time, the clockwise rotation of the cylindrical cam 237 will cease and also that of the notched wheels 411, 412. Further rotation of the handle 120 from this point will cause a clockwise rotation of the arm 410 and pawl 413, the end of the pawl 413 again snapping idly over the notches of the now stationary wheels 411 and 412, until said pawl has reached the extreme end of its rotation in clockwise direction. The clockwise rotation of the pawl 413 after the cylindrical cam 237 has ceased rotating, its co-acting slide 234 having been arrested by the stepped cylinder 231, is shown in Fig. 48. The pawl 413, as shown in Fig. 48, is near its extreme position in clockwise direction, the handle 120 being near its extreme forward position. This brings the parts shown in Fig. 48 into approximately the same position as in Fig. 42; the cylindrical cam 237 and connected parts in Fig. 42 are shown in position corresponding to a higher price having been set up in the previous computation, and the parts in Fig. 48 are shown in a position corresponding to a lower price having been used in the present computation. It will be noted that the cylindrical cam 237 and connected parts may stop anywhere in moving clockwise within their zone of motion, according to the unit-price set up, but the arm 410 and pawl 413 always rotate to their extreme right and left-hand positions.

On operating the handle 120 backward and then forward the price per pound and weight are multiplied and the result represented by the expansion of the device $a$. The abutment 261 is then moved to the left end of said expanding device and the stop 259 is therefore adjusted in accordance with the result of the multiplication. To reduce this position to dollars, dimes and cents is the function of the expanding device $c$ and its connected gears. The stepped part 251 rotates until one of its teeth engages the stop 259. This movement turns the large gear 254 in proportion to the number of dollars in the result. The gear 253 then rotates, further moving the stepped block 251 along the shaft 240 until the side of the tooth engages the side of the stop 259 and moves it to its right hand position compressing spring 259$^a$, thus turning the gear 253 in proportion to the number of dimes in the total. Should there be some cents remaining after the dimes are counted the dime wheel will be moved backward in proportion to the odd cents by engagement of the pawl 270 with a rack 271 (Figs. 14 and 30) connected with the dimes gear 253 as will be explained hereinafter. As the handle 120 is moved backward the springs 255 are wound up and the gears 252, 253 and 254 placed under tension to move forward. They are prevented from moving forward, however, by detents and are released in sequence, the dollars gear being released first, the dimes gear next, and the cents gear last. The dollars gear 254 is held by a retaining pawl 272 (Figs. 5 and 14) which engages a pin 273 on the gear. The detent 272 is rocked to release the dollars gear by means of rod 274, elbow lever 275, and link 276 connected with the thumb lever 262. The spring 269 is provided for holding said thumb lever in its normal position, which spring also draws down the rod 274 (Figs. 5, 11 and 18). The dollars gear is thus released before the handle has made its full forward stroke.

The dimes gear is locked by a pawl 278 which engages a pin upon the gear. Pawl 278 is moved to release the dimes gear, after the dollars gear has been released, by an arm 279 on the trip shaft 405 (Figs. 5 and 14). The dimes gear then moves forward under the tension of its spring, turning the pinion 246 until the expanding device $c$ (Fig. 28) is expanded to its fullest extent against the stop 259. When there are odd cents the dimes wheel must be moved backward an amount proportionate to the number of cents before the cents gear is released. This backward movement is effected by the pawl 270 as follows: The rack 271 is rigidly connected to the dimes wheel 253 and provided with teeth spaced apart an amount equal to the amount of movement of said wheel for one dime. The pawl 270 is on a rock shaft 280 (Figs. 14 and 30) which rock shaft is carried by a frame 281 pivotally mounted on the shaft 124, and held in its normal (upper) position by the spring 281$^a$ connected to the fixed bar 281$^b$. On rock shaft 280 is an arm 282 which is connected by a link 283 with a lever 284 pivoted at 285. The shaft 124 carries an arm 286 having a pin 287 which strikes the lever 284 when the operating handle 120 is near the end of its forward stroke and rocks the arm 282 throwing the pawl 270 into engagement with the rack 271. The arm 282 has a fork 288 at its free end which embraces a pin 289 on the frame 281. The fork permits the pawl to move into engagement with the rack, after which it engages the pin 289 on the frame 281 and the entire frame is rocked down by the further movement of the arm 286 and lever 288. This downward movement is always the same and the movement imparted to the pawl 270 is equal to the distance between adjacent teeth of the rack 271. If there are no cents the dimes wheel will be correctly positioned in the first instance and the pawl 270 will move the distance between two teeth without moving the dimes wheel backward. If, for instance, there are five odd cents in the amount pawl 270 will be positioned first midway between the two teeth of the rack 271 and the first half of the movement of the pawl will have no effect upon the dimes gear. The last half of the movement, it will be evident, will carry the dimes gear back into position to record even dimes. This backward movement will have the effect of loosening the expanding device c. Immediately after this takes place the cents gear 252 is released. This gear is held by a stop pawl 290 (Fig. 5) similar to the stop pawl 278 and is released by an arm 291 on the end of trip shaft 405. The cents wheel then moves forward until the expanding device c is expanded to the limit against stop 259.

The gears 252, 253, 254 are respectively in mesh with pinions 292, 293, 294 (Figs. 9, 33 and 34). The pinion 292 is connected with a cents indicator wheel 295 by means of gear 296 and shaft 297 (Figs. 32 and 33), the indicator 295 being fast on the shaft 297. The pinion 294 is in mesh with gear 298 which is fast on a sleeve 299 Fig. 32 on shaft 297 and on the other end of said sleeve is a dollars indicator 300. The pinion 293 is in mesh with gear 301 which rotates freely on the sleeve 299. On the hub of the gear 301 is mounted a dimes indicator 302. By means of the devices described the indicator wheels 295, 300 and 302 are arranged in their proper order. After each computation these indicator wheels exhibit through openings in their casing the total price of the article weighed in dollars and cents.

By means of a set of indicators 303, 304, 305 and 306 the total of the several purchases which a customer may make is recorded, that is, the various items indicated on the wheels 295, 302 and 300 are added and the sum shown on the second set of indicators. Each of the indicators 295, 300 and 302 has rigidly connected to it a gear in mesh with an idler gear 307 running loosely on a shaft 308 (Figs. 33 and 34). Each of the idler gears is in mesh with a gear 309 which carries a spring pawl 310 adapted to engage internal ratchet teeth 311 on its corresponding total indicator. By means of these ratchets and pawls the oscillating or vibrating movements of the "item" indicators are transformed into continuous forward movements of the "total" indicators.

The total indicating device is provided with tens carrying means as follows: Connected with the unit indicator is a cam 312 upon which bears a roller 313 carried by an arm 314 on a rock shaft 315. Upon said rock shaft is also an arm 316 to the outer end of which is connected a hook pawl 317 engaging the gear 309$^a$ connected to the indicator of the next higher order. At each revolution of the units indicator the shaft 315 is rocked and the indicator of the next higher order is ratcheted forward one point, thus carrying the "tens" from one indicator to the other. Similar devices, to which the same reference figures have been applied, carry the tens from the cents indicator to the dollars indicator and from the dollars indicator to the tens of dollars indicator. A third series of indicators, which may be termed the "grand total" indicators, 318, 319, 320 and 321 are used to indicate the sum of all operations of the machine, the ordinary "total" indicators being set back, if desired, after each customer has been served. The grand total indicators are operated by gears 326 driven by the idlers 307, said gears carrying pawls 327$^a$ which engage ratchet teeth 328$^a$ on the indicators. There are also provided with carrying devices similar to those used on the total indicators. The cams of these carrying devices are indicated by 321$^a$, the rock shafts by 322, the cam arms or levers by 323, the pawl arms by 324, and the hook pawls by 325.

The unit price or price per pound of the article weighed is indicated by a series of numbered disks 422, 422$^a$ and 422$^b$ (Figs. 5 and 9) which are geared through their respective idlers 421, 421$^a$ and 421$^b$ to the said mills, cents and dimes mechanism through gears 201, 202 and 203 thereby indicating the position of said wheels as located by the price keys. The number of ounces is indicated on a disk 425 at the top of the machine (Figs. 5, 9 and 14). The numbered disk 425 is provided with the pinion 426 which through an intermediate gearing is operated by the sector 426$^a$ which through a connecting rod 427, a lever 428 and a second connecting rod 429 is connected with the said arm 174 which is controlled directly by the ounce indicating lever 106. In a similar manner the pounds are indicated on the numbered disk 430 which through intermediate gearing is operated by the sector 431 whose downwardly reaching arm 432 is operated by lever 433 which is pivoted to a standard at 434. It has its projecting arm 435 pivotally connected to the said blade 133 which is directly operated by the pound device 116 through its pin 131. (Fig. 20.)

The numeral disks 303, 304, 305 and 306 are set to their initial or 0 positions in the regular manner well known to the art, that is, the finger wheel 300$^a$ is turned by hand, the pin 300$^b$ riding out of the notch 300$^c$ causes the pin 300$^d$ on the common shaft to move toward the right, as viewed in Fig. 33, until its path is brought in the plane of pin 300$^e$ of the said numeral disk 306 turning the same until the initial position is reached, when pin 300$^b$ drops back into its depression, causing said pin 300$^d$ to slide out of engagement with pin 300$^e$. A similar mechanism at the same time also restores disks 303, 304, 305 to their initial positions.

In addition to indicating the results on the several indicators mechanism is provided for printing the results of the several computations and the sum of the items which may be charged to one party on a bill or slip. The printing mechanism is constructed as follows. At the left end of the casing of the machine is an auxiliary casing 330 containing the printing mechanism. The printing is performed on a strip of paper 331 which is guided through the machine between printing hammers and type wheels. There are three type wheels 332, 333 and 334 in a series for printing the individual items, said wheels being connected respectively to the "item" indicator wheels, as shown in Fig. 32, by pinions 366$^a$, 366, 367, 367$^a$ and concentric shafts 368. The cents wheel has fractions as well as full numbers on it, that is, it contains figures from one-half cent to nine and one-half cents, increasing by one-half cent. If desired the figures may increase by greater or less fractions. The dollars and dimes wheels contain only the figures naught to nine inclusive. The wheels 332, 333 and 334 may be termed the item printing wheels. Coöperating with these wheels is a hammer 335 pivoted at 336. A spring 337 tends to hold this hammer slightly away from the printing wheels and between the hammer and the wheels runs the strip of paper 331 and an inking ribbon 338. Hammer 335 is operated once each time the machine is used by an arm 339 on the shaft 124. When the machine is operated this arm strikes arm 340 of the hammer lever, raising the hammer which is caught and retained in the raised position by a spring pawl 341 engaging a projection 342. When arm 339 moves backward to its normal position it strikes the pawl 341 which releases the hammer and permits it to strike the paper. Connected to the hammer lever is a pawl 343 which operates a ratchet 344 to move the ink ribbon 338. Another pawl 345 operates a ratchet wheel 346 which through gear 346$^b$ rigid therewith operates a feed wheel 347 rigid to a roller 347$^a$ Fig. 32 to feed the paper strip 331 under a cutter blade 348.

A series of total printing wheels 349, 350, 351 and 352 are suitably connected with the total adding wheels of the indicator mechanism so as to indicate the total of the sums printed by the item printing wheels. As shown in Fig. 33 they are driven from the respective gears 309$^a$ through pinions 370, concentric shafts 371, and pinions 369, 369$^a$. When all of the items are printed the hammer 353$^a$ of the total printing device is operated. This hammer is on a lever 353 provided with a spring 354 to hold the hammer normally a slight distance away from the printing wheels. Lever 353 has a pivoted arm 355 which is freely movable in one direction against a slight spring 356 but prevented from moving in the opposite direction by a pin 357 in lever 353. The hammer is operated by a printing lever 358 pivoted at 359 and having a sector gear 360, the middle teeth of which are cut away at 361. When it is desired to print a total the handle of the printing lever 358 is moved upward causing the sector gear to engage with the feed device which, however, is not moved owing to a ratchet connection 346$^c$ between the idler feed wheel 346$^a$ and its ratchet 346 and gear 346$^b$. The lever is then moved downward causing the paper to move until the foot of the column is above the total hammer 353$^a$. A finger 362 then engages arm 355 and operates the hammer 353$^a$ while the part 361 of the sector gear 360 is passing idler 346$^a$. A further downward movement of lever 358 causes the remaining portion of the sector gear to turn the feed wheels and draw the paper out until the total figures are beyond the cutter 348 when the paper may be torn off at the cutter. To prevent the hammer 335 from striking with too great violence it is connected with a dash pot comprising a cylinder 363 and a piston 364. The piston rod passes through the ends of the cylinder, its upper end having a thick portion and a thin portion. During most of the movement of the hammer the thick portion fills the opening in the end of the cylinder and prevents the escape of air, thus causing the hammer to move slowly. But when near the end of the stroke the thick portion of the piston rod passes entirely outside of the cylinder leaving an opening around the thin portion of the rod through which air escapes freely, thus enabling the hammer to strike a quicker blow with moderate force.

The operation of the machine will be understood from the foregoing detailed description. By means of this machine it is possible to perform mechanically all of the counting operations usually performed by hand in stores and other places where commodities are weighed and sold. Furthermore a permanent record of the total amount of sales is kept in the machine as a check upon the salesman.

It is to be noted that the drawings are somewhat diagrammatic, and that the proportions of the various gears are to be such as to secure the proper extent of rotation of the several parts, during the stroke of the handle 120, and it is also to be understood that the various cams shown in the drawings are to be suitably timed to accomplish the purposes set forth above.

Having described my invention what I claim and desire to secure by Letters Patent is:

1. In a weighing and calculating machine, the combination of means for weighing an article and indicating separately the elements of such weight, mechanism representing said elements of weight and operatively connected with said indicating devices, means indicating units of price and controlling the mechanism representing said elements of weight, and means controlled by the elements of weight mechanism for indicating the total price of an article.

2. In a weighing and calculating machine, the combination comprising a device for weighing an article, a device for indicating the unit price of the article, an expanding device to represent the units of the weight of the article operatively connected with the weighing device, a second expanding device operatively connected with the price device, operative means for causing the price expanding device to control the weight expanding device, and means for indicating the total price of the article controlled by one of said expanding devices.

3. In a weighing and calculating machine, the combination comprising a weighing device, having means for indicating the elements of the weight of an article, an expanding device controlled thereby, a price indicating device, a second expanding device operatively connected with the price indicating device and controlling the first expanding device, and means for indicating the total price of an article controlled by said expanding devices.

4. In a weighing and calculating machine, the combination comprising a weighing beam, means for mechanically indicating separately the units of weight of an article on said beam, means operatively connected therewith for representing said units each by a given mechanical element having a variable dimension, means for indicating and mechanically representing separately the denominations of the price per unit of weight each by a mechanical element having a variable dimension, and means controlled by said mechanisms for indicating the total price of an article.

5. In a weighing and calculating machine, the combination of a weighing device, an expanding device operatively connected therewith, and means for adjusting the same to mechanically represent separately the different elements of weight of an article as shown by the weighing device, a second expanding device having indicators and means for adjusting the same to represent the price per unit of weight and means controlled by said expanding devices for indicating the total price.

6. In a weighing and calculating machine, the combination comprising a weighing device, means to mechanically represent separately the different elements of weight of an article as indicated by the weighing device, adjustable price indices, an expanding device expandable in accordance with the setting of said indices to represent the price per unit of weight, and another expanding device operatively connected to and controlled by said mechanisms to represent the total price.

7. In a weighing and calculating machine, the combination of a scale beam, a weight device, means for mechanically attaching the weight device to the beam, means controlled by said weight device to mechanically represent the total weight so applied, keys, means operatively controlled by said keys for mechanically representing the separate denominations of price, such as mills, cents, dimes, etc., per unit of weight, and means for indicating the total price of an article controlled by said weight and price devices.

8. In a weighing and calculating machine, the combination comprising weighing means having indices, mechanism actuated by said means to represent the elements of weight of an article, keys for indicating the separate denominations of the price per unit of weight independently by mills, cents, dimes, etc., and means controlled by said keys for mechanically representing the price per unit of weight and coöperating with the mechanism representing the elements of weight to compute the total price from said representations.

9. In a weighing and calculating machine, the combination comprising a weighing scale, including a beam and unitable weight indices, means coöperating and controlled in accordance with said indices to apply weight to said beam, an expanding device, and means to control the same in accordance with the weight applied.

10. In a weighing and calculating machine, the combination comprising a weighing scale having a beam, mechanical means for connecting pound weights to the scale beam, and an expanding device operatively connected with said means and adjustable automatically in proportion to the number of pound weights connected with the scale.

11. In a weighing and calculating machine, the combination comprising a scale having a beam, means for indicating pounds, an ounce slide independent of said pound indicating means, an index for locating the adjustment of said ounce slide and for indicating the ounces on said beam, an expanding device operatively connected with said slide and means for mechanically representing thereon the number of ounces so indicated on the beam by the slide.

12. In a weighing and calculating machine, the combination comprising a scale having a beam, an ounce slide adjustable longitudinally of the beam, a series of pound weights independent of the ounce slide and means for connecting them with the beam, expanding means operatively connected with both the pounds and ounce devices adapted to be adjusted to mechanically represent the pounds and ounces which the beam is set to weigh.

13. The combination comprising a weighing beam and a mechanism for mechanically representing the total weight of an article multiplied by its unit price, said mechanism comprising a rotatable shaft, a series of hubs arranged to slide on and turn with said shaft, threaded rings on said hubs, means operatively connected with said beam for selecting the proper number of hubs, and means for turning the shaft and hubs relatively to the rings to expand the series in proportion to the number of pounds to be weighed multiplied by the price per pound.

14. The combination comprising a weighing mechanism, a price mechanism and a device operatively connected with said mechanisms for mechanically representing the total weight of an article and for multiplying such weight by its unit price, said devices comprising a rotatable shaft, a series of hubs arranged to slide on and turn with said shaft, a series of threaded rings fitting on said hubs, a series of collars arranged to turn on the hubs, mechanisms normally connecting said hubs and rings to prevent relative movement, and means for disconnecting a portion of the hubs and rings corresponding to the number of pounds to be weighed, and means for turning the shaft to expand the parts comprising said rings and said hubs to represent said number of pounds multiplied by the price per pound.

15. In a weighing and calculating machine, the combination comprising a weighing device, an expanding device operatively connected therewith for mechanically representing the weight of an article, a second expanding device for mechanically representing the price per unit, and an intermediate device operatively connected with both expanding devices by means of which the first-named expanding device is expanded and moved bodily in proportion to the product of weight and unit-price.

16. In a weighing and calculating machine, the combination comprising a weighing device having a beam with indices indicating a condition thereof to denote a specific amount of weight, an expanding device operatively connected with the weighing device for mechanically representing the said weight, a second expanding device for mechanically representing the price per unit weight, mechanism intermediate of said expanding devices comprising an interponent movable into contact with the last-named expanding device, and having a movable inclined surface operating on the first-named expanding device, and means for moving said interponent.

17. In a weighing and calculating machine, the combination comprising weighing mechanism, a device operatively connected therewith containing a normally inoperative expandible element for each pound, within the capacity of the machine, a price mechanism and means for rendering any number of said expanding elements operative under the control of the price mechanism.

18. In a weighing and calculating machine, the combination comprising weighing mechanism, a device operatively connected with the weighing mechanism and containing separate normally inoperative expandible elements for each pound and each capable of adjustment to a different position for each unit price within the capacity of the machine, means for rendering any number of said elements operative, a price mechanism, means under the control thereof to expand the said expanding elements in accordance with the price per pound, and means for moving said expanding devices bodily.

19. In a weighing and calculating machine, the combination with a scale beam, of an expanding device adapted to represent mechanically the number of pounds being weighed on the machine, means to expand the same in accordance with the number of integral pounds being weighed and the price per pound, an ounce slide movable longitudinally of the beam, and means controlled by adjustment of the ounce slide for moving the expanding device bodily a distance proportionate to the number of ounces indicated by any adjustment of the slide.

20. In a weighing and calculating machine, the combination with a scale beam and an ounce slide, of a slide 177, a pin 179 carried by said slide, a pivoted lever in contact with the pin, means connected with the ounce slide for moving said pin along said lever, a price mechanism, price keys controlling said mechanism and automatic means controlled by said mechanism for moving the lever in proportion to the price per unit of weight, whereby a mechanical movement equivalent to the number of ounces multiplied by the price is obtained.

21. In a weighing and calculating machine, the combination comprising weighing means having indices to indicate the elements of weight, mechanism operated by adjustment of the weighing means and corresponding to or representing the elements of weight, keys to indicate the elements of price, an expanding device for mechanically representing the price per unit of weight and controlling the mechanism representing the elements of weight, said expanding device comprising a stepped cylindrical part rotatable in proportion to the number of dimes in the price per unit, an abutting part rotatable in proportion to the number of cents in the part per unit, another abutting part rotatable in proportion to the number of cents in the price per unit, and means for governing the rotation of said parts by actuation of said keys.

22. In a weighing and calculating machine, the combination comprising means for weighing an article having indices for indicating the elements of weight, mechanism operated by adjustment of the weighing means and representing said elements of weight, keys for indicating the elements of price, means controlled by said keys for adjusting the mechanism representing elements of weight in correspondence with the weight multiplied by the price per unit of weight, and a total price mechanism controlled by said element of weight mechanism and comprising an expanding device, dollars, dimes and cents indicators, and means for adjusting said indicators successively in the order named.

23. In a weighing and calculating machine, the combination comprising a weighing beam having indicating means, a weight-representing mechanism, a price-representing mechanism, and means for setting the said weight representing mechanism in a position representing the number of units of weight multiplied by the price per unit, an adjustable stop adapted to be variably positioned under the control of said mechanisms, means for indicating the total price comprising an expanding device consisting of three rotating and axially movable elements corresponding to dollars, dimes and cents in the total price, means for rotating said elements in the order named until said device is fully expanded against said stop, and indicating wheels in gear with said rotating elements.

24. In a weighing and calculating machine, the combination comprising a stop, a weight mechanism, a price mechanism, means for setting the said stop in a position representing the total weight multiplied by the total price per unit of weight, an expanding device comprising a rotating stepped part arranged to move axially to contact with said stop to determine the number of dollars in the total price, a second rotating part movable in proportion to the number of dimes in the total, and a third rotating part movable in proportion to the number of cents in the total, and means for locating said second part to correspond to even dimes.

25. In a weighing and calculating machine, the combination comprising a weighing means having units to indicate the elements of weight, mechanism operatively connected to the weighing means and corresponding to or representing elements of weight, a price mechanism controlling adjustment of said element of weight mechanism, an expanding device operatively connected with said mechanisms and comprising three independently rotating axially movable parts provided with pinions, three gears in mesh with said pinions respectively, springs connected with said gears, means for turning the gears back and placing the springs under tension, detents for holding said gears with the springs under tension, and means for operating said detents to release the gears in succession.

26. In a weighing and calculating machine, the combination comprising weighing means having indices for indicating the elements of weight, mechanism operatively connected to the weighing means and representing the elements of weight, price mechanism controlling adjustment of said element of weight mechanism and including keys to represent the elements of price, an expanding device controlled by said element of weight mechanism having three rotating and axially movable parts provided with pinions, of gears in mesh with said pinions respectively, means for operating the gear in mesh with the dime section of the expanding device to turn the same in an amount corresponding to an even number of dimes, means for moving the gears in mesh with the dime section of the device an amount corresponding to the number of cents and mills in the balance of the price, means for moving said gear backward equal to the odd mills, and means for moving the gear in mesh with the third expanding device an amount corresponding to the odd mills.

27. In a weighing and calculating machine, the combination comprising a weighing beam and means operatively connected therewith for mechanically representing the divisions of weight of an article, means for mechanically representing the price per unit of weight, means operatively connected with said weight and price representing devices for mechanically adjusting said mechanical representing means to determine the total price of the article, and an indicator for indicating said total price.

28. In a weighing and calculating machine, the combination comprising a weighing beam and means operatively connected therewith for mechanically representing the weight of an article by its elements, such as pounds and ounces, separately, means for mechanically representing the price per unit of weight, said means controlling adjustment of the element of weight representing mechanism, and means controlled by the last said mechanism for indicating the total price of the article in its elements, such as mills, cents, etc., and means controlled by said indicating mechanism for printing said price.

29. In a weighing and calculating machine, the combination of means for weighing an article and means operatively connected therewith for representing the weight separately by elements, means for mechanically representing the price per unit of weight separately by elements, means operatively connected with said price and weighing means for mechanically deducing from said representation the total price of the article, an indicator operatively connected therewith for indicating the price of the article, adding mechanism adapted to be actuated from said fourth means to add the prices of a plurality of articles, means controlled by said indicator for printing the prices of the several items, and means controlled by the adding mechanism for printing the total of said prices.

30. In a weighing and calculating machine, the combination comprising means for weighing an article, means operatively connected with the weighing means for mechanically representing said weight, means for mechanically representing the price per unit of weight, adapted to control adjustment of said mechanical weight representing mechanism in accordance with the total price of the article, an item indicator, means for operating said indicator automatically in accordance with said third means to indicate the price of each item, a total indicator to indicate the sum of each customer's items and a grand total indicator to indicate the sum of all items, and means whereby the total and grand total indicators are controlled by said first indicator.

31. In a weighing and calculating machine, the combination comprising a weighing device means operatively connected therewith for mechanically representing the weight of an article, each part separately by elements, means for mechanically representing the price per unit of weight each denomination separately by elements, means operatively connected with said weight and price representing means for mechanically deducing from said representations the total price of the article, and means controlled by the last said means for printing the price of the article upon a slip of paper.

32. In a weighing and calculating machine, the combination comprising a weighing device, means for mechanically representing each denomination of weight separately by its elements, means for representing the price per unit of weight, means for mechanically deducing from said representations the total price of the article, means operatively connected with said last means for printing the price of the article upon a slip of paper, and means operatively connected with the total representing mechanism for printing the total price of a series of articles on said slip.

33. The combination in a computing and weighing machine, of mechanism for weighing an article, separate mechanism operatively connected with the weighing mechanism for representing the elements of weight independently of each other, mechanism for indicating the elements of price per unit of weight independently of each other, and mechanism controlled by the conjoint action of the unit-price mechanism and the weight-representing mechanism to indicate the total price of each article.

34. In a machine of the character described, mechanism for weighing an article, mechanism for designating its unit price, mechanisms operatively connected with both of said mechanisms respectively for representing the separate units of the weight thereof and the price per element of weight, means of combining said representations of the price per element of weight and mechanism operable in connection with the last said means for indicating the total result.

35. The combination in a weighing and computing mechanism, of means for weighing an article including a scale beam having thereon indices indicating elements of weight, ounce and pound mechanisms applied differently to said beam, key indices for indicating different unit prices, and adjustable means controlled by said keys and weighing means for effecting a multiplication of the total weight by the unit price.

36. The combination in a weighing and computing mechanism, of a scale beam, ounce and pound counter-balancing mechanisms applied differently to said beam, keys for indicating elements of price per unit of weight, adjustable means controlled by said weighing device and price keys for effecting multiplication of the total weight by the unit price, and mechanism controlled by the last said means for indicating the result.

37. The combination comprising weighing mechanism, separate mechanism operatively connected therewith for mechanically representing the elements of weight independently of each other, mechanism for mechanically representing the elements of price per unit of weight independently of each other, article-price mechanism operatively connected therewith for representing the total weight multiplied by the unit price, and mechanism operated by said article-price mechanism for successively indicating the total price of successive articles weighed and computed.

38. The combination in a weighing, computing and recording machine comprising weighing devices, separate mechanism operatively connected therewith for mechanically representing the elements of weight independently of each other, mechanism for mechanically representing the elements of price per unit of weight independently of each other, article-price mechanism operatively connected with both said mechanisms for representing the total weight multiplied by the unit price, mechanism operated by said article-price mechanism for indicating the total result, and mechanism operatively connected with the indicating mechanism for recording the total indicated thereby.

39. The combination in a weighing, computing and recording mechanism, of a scale beam, ounce and pound mechanisms applied differently to said beam, keys for indicating the elements of price per unit of weight independently of each other, and means controlled by said keys and weighing devices for multiplying the total weight by the unit price, mechanism coöperating therewith for indicating the total result, and mechanism operatively connected with the indicating mechanism for recording said result.

40. In a combined weighing, computing and recording machine, the combination of means for weighing, including separate mechanism for indicating the elements of weight independently of each other, mechanism for indicating the elements of price per unit of weight independently of each other, mechanism controlled by both said weight and price mechanisms for multiplying the total weight by the unit price, mechanism operatively connected with said multiplying mechanism for indicating and recording the total price of each article, and mechanism operatively connected with the article price recording means for indicating and recording the total price of a plurality of articles.

41. In a machine of the class described, a weighing device, means operatively controlled by the setting of said weighing device for effecting a mechanical representation of the weight, a price device controlling said means to multiply the total weight by the unit price, mechanism operatively connected therewith for indicating the price of an article and for recording the same, and mechanism controlled thereby for indicating and recording the price of a series of articles.

42. In a machine of the character described, a weighing device, a series of groups of multiplying devices, controlled by the weighing device, each group containing a mechanical representation of the digits, means for moving the multiplying devices in each group separately, wheels to receive the products, and means operatively connected with said wheels for recording the products.

43. A weighing and computing apparatus combining means for weighing an article, means for mechanically representing the weight thereof, means for mechanically representing the unit price, means controlled in accordance with the setting of said first and second means for setting up the article price, a denominational indicator operated from said last means, and a device interposed between said last means and said indicator to reverse the relative locations of relatively higher and lower denominations.

44. A weighing and computing apparatus combining means for weighing an article, means for mechanically representing the weight thereof, an indicator means operable in accordance with said representation to actuate said indicator, a plurality of totalizers for accumulating the successive numbers shown on the indicator for successive articles, and means for resetting one totalizer without disturbing another totalizer.

45. A weighing and computing apparatus combining means for weighing an article and for mechanically representing the weight thereof, means for mechanically representing the unit price, means controlled in accordance with said representations for mechanically representing the article price, a recording device comprising a printing hammer to print the article price, and an air dash-pot cushioning the movement of said hammer.

46. A weighing and computing apparatus combining means for weighing an article and for mechanically representing the weight thereof, means for mechanically representing the unit price, means controlled in accordance with said representations for mechanically representing the article price, a totalizer adapted to accumulate successive article prices, a recording device, and an air dashpot associated with movable elements for cushioning the movement thereof.

47. A weighing and computing apparatus combining means for weighing an article and for mechanically representing the weight thereof, means for mechanically representing the unit price, means controlled in accordance with both of said representations for mechanically representing the article price, and an indicator comprising denominational digit wheels actuated *seriatim* in accordance with said last means to indicate the article price.

48. A weighing and computing apparatus combining means for weighing an article and for mechanically representing the weight thereof, digit keys operable to set up a unit price, indexing means operated in accordance with the setting of said keys for mechanically representing the unit price, means controlled in accordance with both of said representations for deducing the article price, an indicator comprising denominational digit wheels actuated *seriatim* in accordance with said last-named means to indicate the article price, and means for resetting said indicator prior to the next operation of the apparatus.

49. A weighing and computing apparatus combining means for weighing an article and for mechanically representing the weight thereof, digit keys operable to set up a unit price, indexing means operated in accordance with the setting of said keys for mechanically representing the unit price, means controlled in accordance with both of said representations for deducing the article price, an indicator comprising denominational digit wheels actuated *seriatim* in accordance with said last-named means to indicate the article price, a plurality of totalizers for accumulating successive article prices, and means for resetting one totalizer without disturbing another totalizer.

50. A weighing and computing apparatus combining means for weighing an article, means for representing the weight thereof, means for representing the unit price, means controlled in accordance with both of said representations for representing the article price, a totalizer comprising denominational digit wheels actuated *seriatim* in accordance with said last means to accumulate the total of successive article prices, a separate totalizer comprising denominational digit wheels actuated *seriatim* in accordance with said last means to accumulate a grand total of successive article prices, and means for resetting the first totalizer without disturbing the second.

51. The combination comprising weighing mechanism, separate mechanism operatively connected therewith for indicating the elements of weight independently of each other, mechanism for indicating the elements of price per unit of weight independently of each other, mechanism operatively connected therewith for multiplying the total weight by the unit price, and mechanism for successively indicating the total price of successive numbers of articles weighed and computed.

52. The combination in a weighing, computing and recording mechanism comprising weighing mechanism, separate mechanism operatively connected therewith for indicating the elements of weight independently of each other, mechanism for indicating the elements of price per unit of weight independently of each other, mechanism operatively connected with both said devices for multiplying the total weight by the unit price, mechanism for indicating the total result, and mechanism for recording the same.

53. A computing apparatus combining a weighing device, a price-representing device, multiplying parts controlled by the coöperation of said devices, digit wheels receiving and indicating the products, and a totalizer operated from said digit wheels to accumulate successive products.

In testimony whereof I affix my signature, in presence of two witnesses.

BENJAMIN M. DES JARDINS.

Witnesses:
JAMES A. WATSON,
E. M. OLMSTED.

Copies of this patent may be obtained for five cents each, by addressing the "Commissioner of Patents, Washington, D. C."